United States Patent
Jiang et al.

(10) Patent No.: US 10,440,726 B2
(45) Date of Patent: **\*Oct. 8, 2019**

(54) SCALED SYMBOLS FOR A SELF-CONTAINED TIME DIVISION DUPLEX (TDD) SUBFRAME STRUCTURE

(71) Applicant: QUALCOMM Incorporated, San Diego, CA (US)

(72) Inventors: Jing Jiang, San Diego, CA (US); Peter Pui Lok Ang, San Diego, CA (US); Tingfang Ji, San Diego, CA (US); John Edward Smee, San Diego, CA (US); Joseph Binamira Soriaga, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/784,036

(22) Filed: Oct. 13, 2017

(65) Prior Publication Data

US 2018/0042035 A1 Feb. 8, 2018

Related U.S. Application Data

(63) Continuation of application No. 15/011,304, filed on Jan. 29, 2016, now Pat. No. 9,814,058.
(Continued)

(51) Int. Cl.
*H04W 4/00* (2018.01)
*H04W 72/12* (2009.01)
(Continued)

(52) U.S. Cl.
CPC ........... *H04W 72/1205* (2013.01); *H04L 1/00* (2013.01); *H04L 1/1607* (2013.01);
(Continued)

(58) Field of Classification Search
CPC ..... H04W 28/04; H04W 28/06; H04W 72/04; H04W 72/12; H04W 72/1205;
(Continued)

(56) References Cited

U.S. PATENT DOCUMENTS 7,515,579 B2 4/2009 Cheng et al.
8,363,597 B2 1/2013 Abraham et al.
(Continued)

FOREIGN PATENT DOCUMENTS

CN 102404841 A 4/2012
EP 2836044 A1 2/2015
(Continued)

OTHER PUBLICATIONS

Qualcomm Technologies Inc., The 5G Unified Air Interface Scalable to an extreme variation of requirements, 46 pages, Nov. 2015.*
(Continued)

*Primary Examiner* — Frank Duong
(74) *Attorney, Agent, or Firm* — Qualcomm IP Dept.; James Hunt Yancey, Jr.

(57) ABSTRACT

In an aspect of the disclosure, a method, a computer program product, and an apparatus are provided. The method may be performed by a scheduling entity. The scheduling entity transmits control information in a control portion of the subframe, the control information corresponding to data information within the subframe, transmits the data information in a data portion of the subframe, receives a pilot signal from the set of subordinate entities in a pilot portion of the subframe, and receives an ACK/NACK signal from the set of subordinate entities in an ACK portion of the subframe. The ACK portion is subsequent to the pilot portion of the subframe. The ACK/NACK signal includes acknowledgment information corresponding to the data information. The control portion, the data portion, the pilot
(Continued)

portion, and the ACK portion are contained in the same subframe.

30 Claims, 15 Drawing Sheets

Related U.S. Application Data

(60) Provisional application No. 62/162,557, filed on May 15, 2015.

(51) Int. Cl.
  *H04L 1/16* (2006.01)
  *H04L 5/14* (2006.01)
  *H04L 1/00* (2006.01)
  *H04L 5/00* (2006.01)

(52) U.S. Cl.
  CPC .......... *H04L 5/0055* (2013.01); *H04L 5/1469* (2013.01); *H04L 5/0007* (2013.01); *H04L 5/0044* (2013.01)

(58) Field of Classification Search
  CPC ..... H04W 74/04; H04W 80/04; H04W 84/12; H04W 88/06; H04W 88/08; H04L 1/16; H04L 1/1607; H04L 5/0007; H04L 5/0044; H04L 5/0055; H04L 5/14; H04L 5/1469; H04B 7/2643
  See application file for complete search history.

(56) References Cited

U.S. PATENT DOCUMENTS

| | | | |
|---|---|---|---|
| 8,472,465 B2 | 6/2013 | Suo et al. | |
| 8,599,702 B2 | 12/2013 | Kim et al. | |
| 8,614,977 B2 | 12/2013 | Wu et al. | |
| 8,700,023 B2 | 4/2014 | Nan et al. | |
| 8,724,636 B2 | 5/2014 | Chen et al. | |
| 8,756,477 B2 | 6/2014 | Challa et al. | |
| 8,787,344 B2 | 7/2014 | Malladi et al. | |
| 8,848,620 B2 | 9/2014 | Fan et al. | |
| 8,948,064 B2 | 2/2015 | Shahar | |
| 9,398,575 B2 | 7/2016 | Clevorn | |
| 9,930,687 B2 | 3/2018 | Mizusawa et al. | |
| 9,936,519 B2 | 4/2018 | Mukkavilli et al. | |
| 9,955,460 B2 | 4/2018 | Tavildar et al. | |
| 10,075,970 B2 | 9/2018 | Jiang et al. | |
| 10,123,219 B2 | 11/2018 | Bhushan et al. | |
| 2003/0108013 A1 | 6/2003 | Hwang et al. | |
| 2008/0070586 A1 | 3/2008 | Kermoal et al. | |
| 2008/0080476 A1 | 4/2008 | Cho et al. | |
| 2008/0220791 A1 | 9/2008 | Cho et al. | |
| 2009/0040999 A1 | 2/2009 | Yuk | |
| 2009/0137230 A1 | 5/2009 | Miyoshi et al. | |
| 2009/0141690 A1 | 6/2009 | Fan et al. | |
| 2009/0161591 A1 | 6/2009 | Ahmadi et al. | |
| 2009/0161649 A1 | 6/2009 | Ponnathota et al. | |
| 2009/0201838 A1 | 8/2009 | Zhang et al. | |
| 2009/0213769 A1 | 8/2009 | Shen et al. | |
| 2009/0323666 A1 | 12/2009 | Malladi et al. | |
| 2010/0118730 A1 | 5/2010 | Tanaka et al. | |
| 2010/0275086 A1 | 10/2010 | Bergquist et al. | |
| 2012/0057547 A1 | 3/2012 | Loehr et al. | |
| 2012/0135773 A1 | 5/2012 | Shen et al. | |
| 2012/0287882 A1 | 11/2012 | Kim et al. | |
| 2013/0028205 A1 | 1/2013 | Damnjanovic et al. | |
| 2013/0039193 A1 | 2/2013 | Yin et al. | |
| 2013/0039231 A1 | 2/2013 | Wang | |
| 2013/0083736 A1 | 4/2013 | Yin et al. | |
| 2013/0083740 A1 | 4/2013 | Eriksson et al. | |
| 2013/0121186 A1 | 5/2013 | Vajapeyam et al. | |
| 2013/0128781 A1 | 5/2013 | Li et al. | |
| 2013/0194980 A1 | 8/2013 | Yin et al. | |
| 2013/0242904 A1 | 9/2013 | Sartori et al. | |
| 2013/0301486 A1 | 11/2013 | Kishiyama | |
| 2013/0343239 A1 | 12/2013 | Damnjanovic et al. | |
| 2014/0050192 A1 | 2/2014 | Kim et al. | |
| 2014/0071954 A1 | 3/2014 | Au et al. | |
| 2014/0133369 A1 | 5/2014 | Cheng et al. | |
| 2014/0153450 A1 | 6/2014 | Jang et al. | |
| 2014/0204783 A1 | 7/2014 | Lin et al. | |
| 2014/0204807 A1 | 7/2014 | Li et al. | |
| 2014/0241225 A1 | 8/2014 | Novak et al. | |
| 2014/0342745 A1 | 11/2014 | Bhushan et al. | |
| 2015/0036561 A1 | 2/2015 | Wang et al. | |
| 2015/0085834 A1 | 3/2015 | Liu et al. | |
| 2015/0092566 A1 | 4/2015 | Balachandran et al. | |
| 2015/0103702 A1 | 4/2015 | Lahetkangas et al. | |
| 2015/0109972 A1 | 4/2015 | Khoryaev et al. | |
| 2015/0180619 A1 | 6/2015 | Majjigi et al. | |
| 2015/0181612 A1 | 6/2015 | Gan et al. | |
| 2015/0188650 A1 | 7/2015 | Au et al. | |
| 2015/0264662 A1 | 9/2015 | Sahlin et al. | |
| 2015/0326291 A1 | 11/2015 | Wong et al. | |
| 2015/0358918 A1 | 12/2015 | Gao et al. | |
| 2016/0142292 A1 | 5/2016 | Au et al. | |
| 2016/0192396 A1 | 6/2016 | Ng et al. | |
| 2016/0205683 A1 | 7/2016 | Quan et al. | |
| 2016/0212734 A1 | 7/2016 | He et al. | |
| 2016/0233904 A1 | 8/2016 | Wu et al. | |
| 2016/0234834 A1 | 8/2016 | Aboul-Magd et al. | |
| 2016/0249329 A1 | 8/2016 | Au et al. | |
| 2016/0270070 A1 | 9/2016 | Mukkavilli et al. | |
| 2016/0315741 A1 | 10/2016 | Tsai et al. | |
| 2016/0323852 A1 | 11/2016 | Golitschek et al. | |
| 2016/0330737 A1 | 11/2016 | Takeda et al. | |
| 2016/0338081 A1 | 11/2016 | Jiang et al. | |
| 2016/0366704 A1 | 12/2016 | Lee et al. | |
| 2017/0013610 A1 | 1/2017 | Lee et al. | |
| 2017/0019905 A1 | 1/2017 | Ko et al. | |
| 2017/0019930 A1 | 1/2017 | Lee et al. | |
| 2017/0118743 A1 | 4/2017 | Kim et al. | |
| 2017/0150367 A1 | 5/2017 | Han et al. | |
| 2017/0150424 A1 | 5/2017 | Lee et al. | |
| 2017/0215188 A1 | 7/2017 | Kim et al. | |
| 2017/0215201 A1 | 7/2017 | Kim et al. | |
| 2017/0257878 A1 | 9/2017 | Kazmi et al. | |
| 2017/0303144 A1 | 10/2017 | Guo et al. | |
| 2018/0006743 A1 | 1/2018 | Zhu et al. | |
| 2018/0098348 A1 | 4/2018 | Mukkavilli et al. | |
| 2018/0124783 A1 | 5/2018 | Mukkavilli et al. | |
| 2019/0007956 A1 | 1/2019 | Jiang et al. | |

FOREIGN PATENT DOCUMENTS

| | | |
|---|---|---|
| JP | 2012175258 A | 9/2012 |
| JP | 2014500685 A | 1/2014 |
| KR | 20140073534 A | 6/2014 |
| TW | I456936 B | 10/2014 |
| WO | 2008028006 A2 | 3/2008 |
| WO | 2009022391 A1 | 2/2009 |
| WO | 2009100069 | 8/2009 |
| WO | 2009124079 A1 | 10/2009 |
| WO | 2010118371 A1 | 10/2010 |
| WO | 2013110228 A1 | 8/2013 |
| WO | 2013176597 A1 | 11/2013 |
| WO | 2014067140 A1 | 5/2014 |
| WO | 2014179964 A1 | 11/2014 |

OTHER PUBLICATIONS

Pedersen et all, A Flexible Frame Structure for 5G Wide Area, IEEE, 5 pages, 2015.*
Lahetkangas et al, Achieving low latency and energy consumption by 5G TDD mode optimization, IEEE, 6 pages, 2014.*
Levanen et al, Radio Interface Design for Ultra-Low Latency Millimeter-Wave Communications in 5G Era, IEEE, 2014.*
3GPP 36.211, "3rd Generation Partnership Project, Technical Specification Group Radio Access Network, Evolved Universal Terrestrial Radio Access (E-UTRA), Physical Channels and Modulation

(56) References Cited

OTHER PUBLICATIONS (Release 8)", 3GPP Standard, 3GPP TS 36.211 V8.5.0, Dec. 1, 2008 (Dec. 1, 2008), pp. 1-82, XP050377537.
"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".
"Chapter 12: Retransmission Protocols" In: Erik Dahlman: "4G LTE/LTE—Advanced for Mobile Broadband", Nov. 30, 2013 (Nov. 30, 2013), Academic Press, XP002758475, pp. 299-319, Sections 12.1, 12.1.3.2.
Co-pending U.S. Appl. No. 15/857,543, filed Dec. 28, 2017.
Co-pending U.S. Appl. No. 15/857,571, filed Dec. 28, 2017.
Eeva L., et al., "On the TDD Subframe Structure for Beyond 4G Radio Access Network", 2013 Future Network & Mobile Summit, Authors, Jul. 3, 2013 (Jul. 3, 2013), pp. 1-10.
Lu Y., et al., "Uplink Control for Low Latency HARQ in TDD Carrier Aggregation", Vehicular Technology Conference (VTC Spring), 2012 IEEE 75th, IEEE, May 6, 2012 (May 6, 2012), pp. 1-5, XP032202607, DOI: 10.1109/VETECS.2012.6240190, ISBN: 978-1-4673-0989-9, abstract Section I; p. 1.
Mediatek Inc: "Discussions on UL HARQ for Rel-13 MTC UE", 3GPP Draft, R1-150675 Discussions on UL HARQ for Rel-13 MTC UE, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9, 2015-Feb. 13, 2015 Feb. 8, 2015 (Feb. 8, 2015), pp. 1-5, XP050933875, Retrieved from the Internet: URL:http://www.3gpp.org/ftp/Meetings_3GPP_SYNC/RAN1/Docs/ [retrieved on Feb. 8, 2015] Section 2.
Partial European Search Report—EP18189408—Search Authority—The Hague—dated Nov. 30, 2018.
Soret B., et al., "Fundamental Tradeoffs among Reliability, Latency and Throughput in Cellular Networks," IEEE Proceedings of GLOBECOM, Dec. 2014, pp. 1391-1396.
Tiedemann E., et al., "5G: The Next Generation (Big Wave) of Wireless," Jul. 22, 2015 (Jul. 22, 2015), XP055280307, Retrieved from the Internet URL:https://www.nttdocomo.co.jp/binary/pdf/corporate/technology/rd/tech/5g/NTTDOCOMO 5G TBS lecture6.pdf.

Toni L., et al., "Low latency radio interface for 5G flexible TDD local area communications", 2014 IEEE International Conference on Communications Workshops (ICC), IEEE, Jun. 10, 2014 (Jun. 10, 2014), pp. 7-13, XP032630785, DOI: 10.1109/ICCW.2014.6881164 [retrieved on Aug. 20, 2014] the whole document.
ZTE: "Issues About Data Transmission in TDD-eIMTA", 3GPP Draft, R1-132108 Issues About Data Transmission in TDD-eIMTA, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 20, 2013-May 24, 2013 May 11, 2013 (May 11, 2013), pp. 1-4, XP050697886, Retrieved from the Internet: URL: http://www.3gpp.org/ftp/tsg_ran/WG1_RL1/TSGR1_73/Docs/ [retrieved on May 11, 2013] the whole document.
International Search Report and Written Opinion—PCT/US2016/032526—ISA/EPO—dated Nov. 7, 2016.
Lahetkangas E.,et al., "On the TDD Subframe Structure for Beyond 4G Radio Access Network," Future Network & MobileSummit 2013 Conference Proceedings, 2013, pp. 10.
Partial International Search Report—PCT/US2016/032526—ISA/EPO—dated Sep. 14, 2016.
Popovski P.,et al., "Deliverable D2.3 Components of a new air interface-building blocks and performance," Mobile and wireless communications Enablers for the Twenty-twenty Information Society, ICT-317669-METIS/D2.3, 2014, pp. 117.
Popovski P.,et al., "Deliverable D2.4 Proposed solutions for new radio access," Mobile and wireless communications Enablers for the Twenty-twenty Information Society, IICT-317669-METIS/D2.4, 2015, pp. 190.
Smee J.E, "5G Design Across Services," May 12, 2015 (May 12, 2015), XP055299081, Retrieved from the Internet: URL:https://johannesbergsummit.com/wp-content/uploads/sites/6/2014/11/Tuesday_3_John -Smee.pdf [retrieved on Aug. 31, 2016].
Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].
Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415.
European Search Report—EP18189408—Search Authority—The Hague—dated Apr. 8, 2019.

* cited by examiner

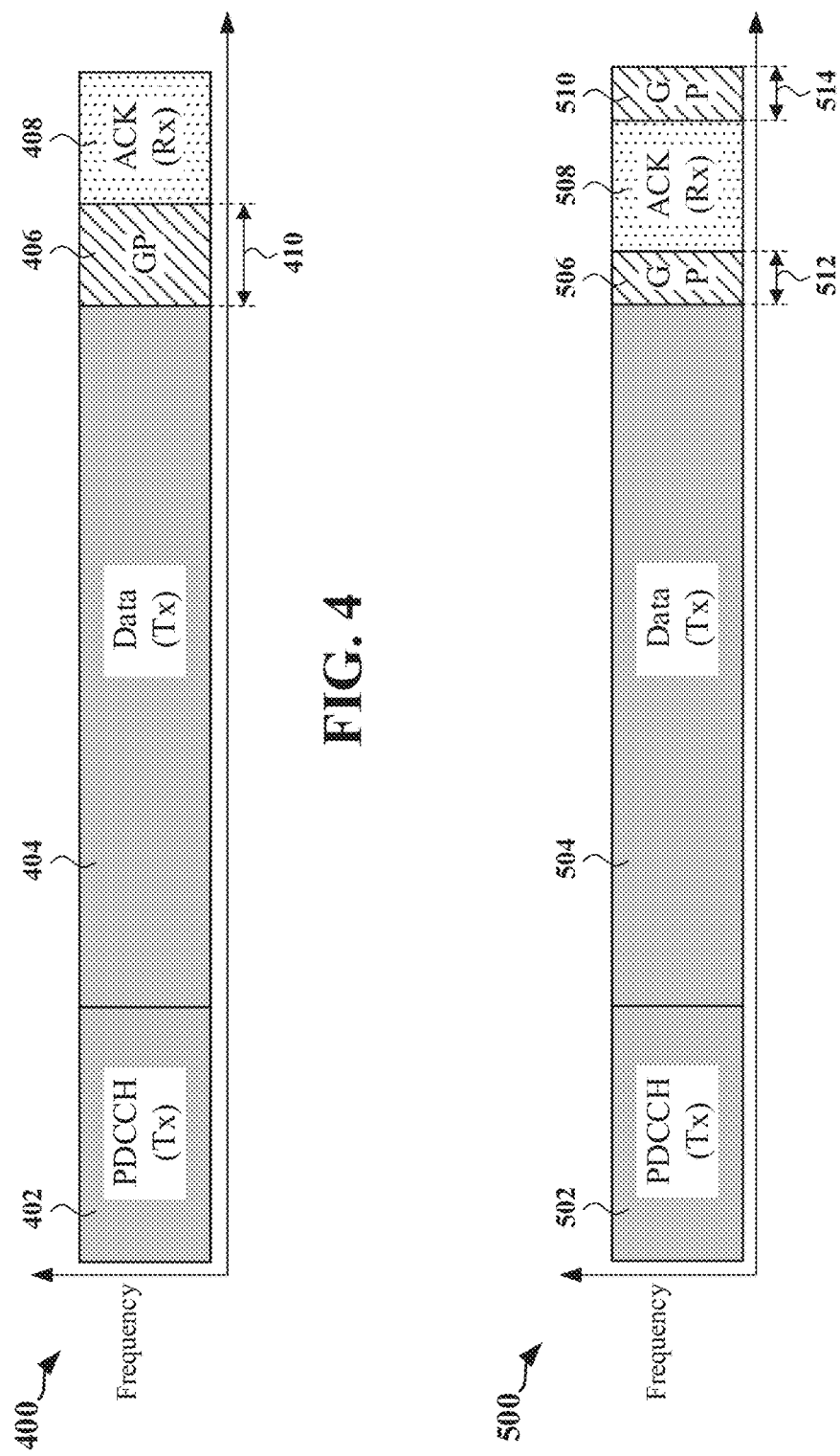

SCALED SYMBOLS FOR A SELF-CONTAINED TIME DIVISION DUPLEX (TDD) SUBFRAME STRUCTURE

PRIORITY CLAIM

This application is a continuation of co-pending nonprovisional patent application Ser. No. 15/011,304, filed on Jan. 29, 2016, which claims priority to and benefit of U.S. provisional patent application Ser. No. 62/162,557, filed on May 15, 2015. Both of said applications are assigned to the assignee hereof and hereby expressly incorporated by reference herein as if fully set forth below and for all applicable purposes.

TECHNICAL FIELD

Aspects of the present disclosure relate generally to wireless communication systems, and more particularly, to scaling symbols for self-contained time division duplex (TDD) subframe structures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standard include Long Term Evolution (LTE) and LTE-Advanced (LTE-A), which include a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in multiple access technologies technology. Preferably, these improvements should be applicable to existing and developing multi-access technologies and the telecommunication standards that employ such technologies.

BRIEF SUMMARY OF SOME EXAMPLES

One aspect provides a method of wireless communication in a synchronous network for a subordinate entity to communicate with a scheduling entity utilizing a time division duplex (TDD) carrier, where the TDD carrier includes a subframe. The method includes receiving control information in a control portion of the subframe, the control information corresponding to data information within the subframe, receiving the data information in a data portion of the subframe, transmitting a pilot signal to the scheduling entity in a pilot portion of the subframe, and transmitting an acknowledged (ACK)/not acknowledged (NACK) signal to the scheduling entity in an ACK portion of the subframe, the ACK portion being subsequent to the pilot portion of the subframe, the ACK/NACK signal comprising acknowledgment information corresponding to the data information. The control portion, the data portion, the pilot portion, and the ACK portion are contained in the same subframe.

In one example, the subframe includes a guard period portion after the data portion and before the pilot portion, where a total duration of the guard period portion and the pilot portion is greater than or equal to an approximate duration of a full symbol in the subframe. In such example, the method further includes processing the data information received in a final symbol of the data portion of the subframe within the total duration of the guard period portion of the subframe and the pilot portion of the subframe. For example, a duration of the guard period portion may be less than the duration of a full symbol in the subframe. In one example, the subframe includes a second guard period portion after the ACK portion of the subframe, where a duration of the second guard period portion is less than the duration of a full symbol in the subframe.

In one example, the pilot portion includes a first cyclic prefix (CP) and the ACK portion includes a second CP. In one example, a duration of the pilot portion of the subframe is different from a duration of the ACK portion of the subframe.

One aspect of the present disclosure provides a method of wireless communication in a synchronous network for a scheduling entity to communicate with a set of one or more subordinate entities utilizing a TDD carrier, where the TDD carrier includes a subframe. The method includes determining a downlink (DL) to uplink (UL) switching period associated with the one or more subordinate entities, determining a signal propagation delay period between the scheduling entity and the one or more subordinate entities, and dividing a full symbol in the subframe into a plurality of scaled symbols, at least one of the plurality of scaled symbols having a duration that is equal to or greater than a total of the DL to UL switching period and the signal propagation delay period.

In one example, the at least one of the plurality of scaled symbols serves as a guard period. In such example, the method further includes transmitting data information to the one or more subordinate entities in one or more of the plurality of scaled symbols.

In one example, each of the plurality of scaled symbols are allocated less tones than the full symbol. In another example, each of the plurality of scaled symbols have a same duration, where in one example the scaled symbols have a scaled subcarrier spacing as the nominal symbols to avoid the need for multiple sampling rates.

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 illustrates an example structure of a self-contained subframe.

FIG. 5 illustrates an example structure of a self-contained subframe.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
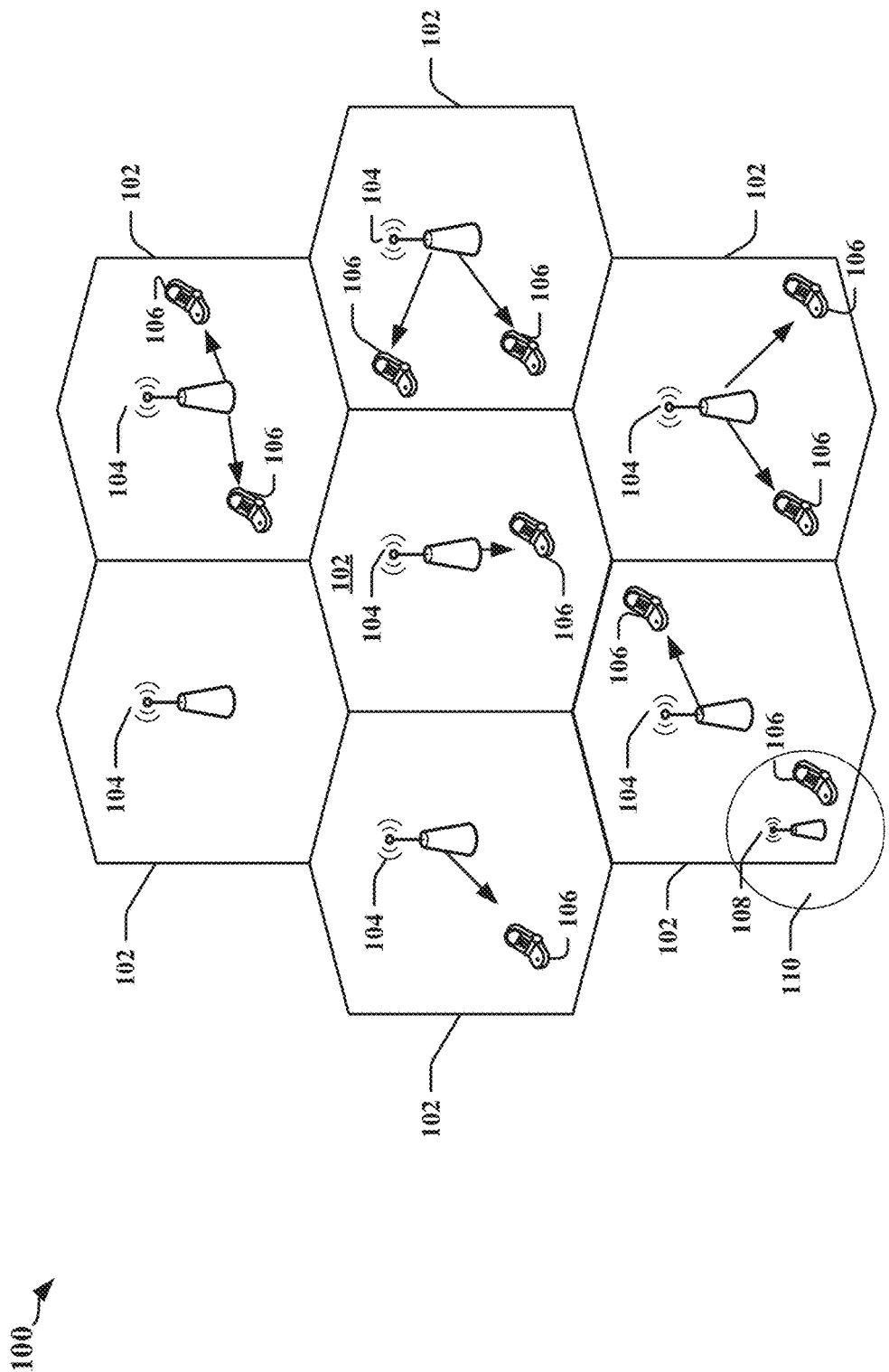
FIG. 1 is a diagram illustrating an example of a network architecture.

FIG. 1 is a diagram illustrating a generalized example of an access network 100. In this example, the access network 100 is divided into a number of cellular regions (cells) 102. One or more lower power class base stations 108 may have cellular regions 110, 112 that overlap with one or more of the cells 102. The lower power class base stations 108 may be a femto cell (e.g., pico cell, micro cell, remote radio head, or in some instances, another user equipment (UE) 106 (as illustrated generally as the mesh network 112). The base stations 104 are each assigned to a respective cell 102 and are configured to provide an access point to a core network for all the UEs 106 in the cells 102. There is no centralized controller in this example of an access network 100, but a centralized controller may be used in alternative configurations. The base stations 104 are responsible for all radio related functions including radio bearer control, admission control, mobility control, scheduling, security, and connectivity to the serving gateway 116.

The modulation and multiple access scheme employed by the access network 100 may vary depending on the particular telecommunications standard being deployed. In some radio access networks, such as those defined according to the evolved packet system (EPS) or long-term evolution (LTE), orthogonal frequency division multiplexing (OFDM) may be used on the downlink (DL) and single-carrier frequency division multiple access (SC-FDMA) may be used on the uplink (UL) to support both frequency division duplexing (FDD) and time division duplexing (TDD). As those skilled in the art will readily appreciate from the detailed description to follow, the various concepts presented herein are well suited for various applications including telecommunication standards employing other modulation and multiple access techniques. By way of example, these concepts may be employed in future fifth-generation (5G) standards, LTE, Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards, employing code division multiple access (CDMA) to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. The actual wireless communication standard and the multiple access technology employed will depend on the specific application and the overall design constraints imposed on the system.

The base stations 104 may have multiple antennas supporting MIMO technology. The use of MIMO technology enables the base stations 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 106 with different spatial signatures, which enables each of the UE(s) 106 to recover the one or more data streams destined for that UE 106. On the UL, each UE 106 transmits a spatially precoded data stream, which enables the base stations 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of an access network described herein may relate to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix or CP) may be added to each OFDM symbol to combat inter-OFDM-symbol interference. The UL may use SC-FDMA in the form of a DFT-spread OFDM signal to compensate for high peak-to-average power ratio (PAPR).

Figure 2:
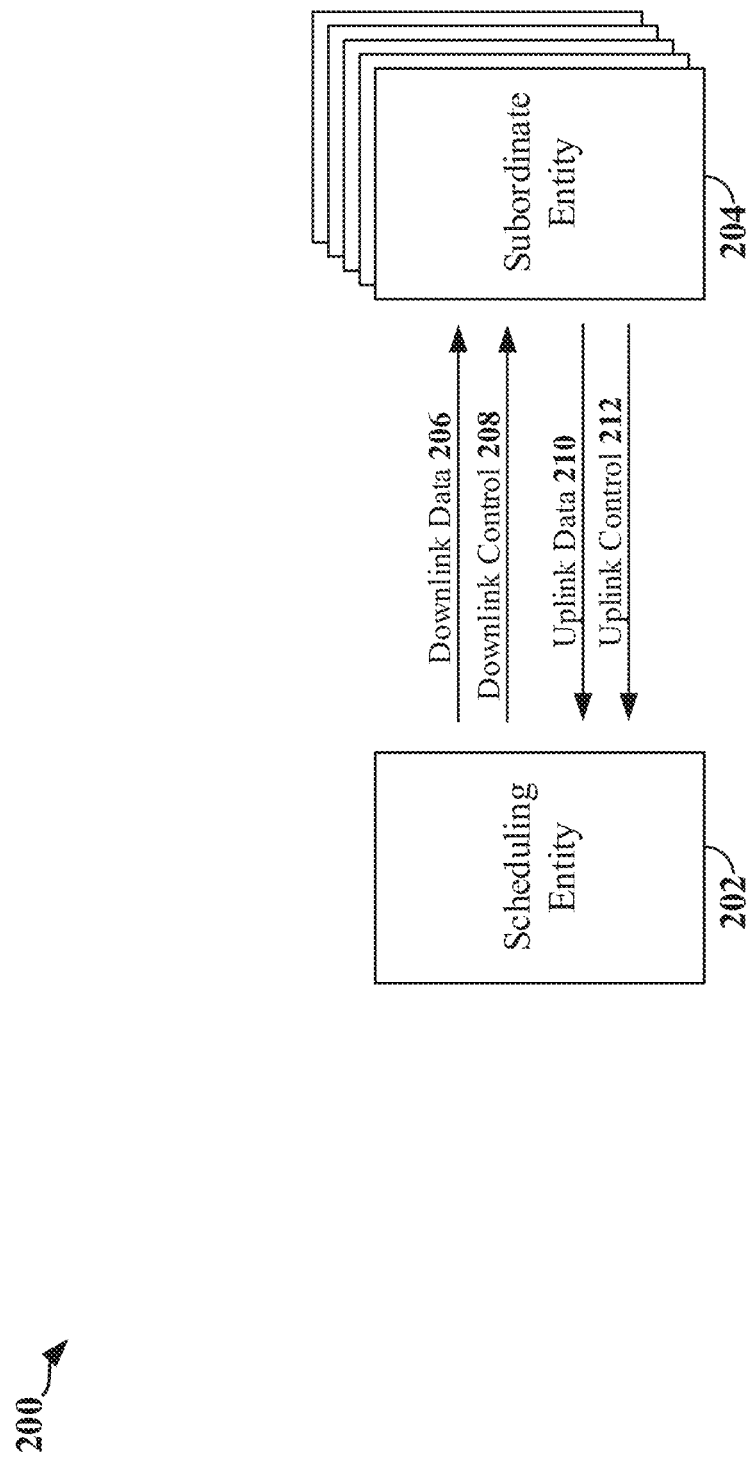
FIG. 2 is a block diagram illustrating a scheduling entity and a plurality of subordinate entities.

Referring now to FIG. 2, a block diagram illustrates a scheduling entity 202 communicating with a plurality of subordinate entities 204 utilizing uplink and downlink data and control channels. For example, the scheduling entity 202 may be a base station, Node B, eNode B, network access point, etc. As another example, the scheduling entity 202 may be a UE in a device-to-device (D2D) and/or mesh network. The scheduling entity 202 manages the resources on the carrier and assigns resources to other users of the channel, including subordinate or scheduled entities in a cellular network. For example, the subordinate entities 204 may be UEs or Internet of everything (IOE) devices. Of course, the channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

As illustrated in FIG. 2, the scheduling entity 202 may broadcast downlink data 206 to one or more subordinate entities 204. In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. (Another way to describe the scheme may be to use the term broadcast channel multiplexing.) In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded, i.e., the shortest decodable transmission of information. In various examples, TTIs may correspond to frames, to data blocks, time slots, or other suitable groupings of bits for transmission.

Furthermore, the subordinate entities 204 may transmit a feedback channel 214 to the scheduling entity 202. The feedback channel 214 may in some examples include a request for the scheduling entity to schedule uplink transmissions. Here, in response to the request transmitted on the feedback channel 214, the scheduling entity 202 may transmit in the control channel 212 information that may schedule the TTI with uplink packets. In a further example, the feedback channel 214 may include information about interference experienced at the subordinate entity 204, which the scheduling entity 202 may utilize dynamically to modify downlink transmissions in a way that may make further downlink transmissions more robust to the interference.

Figure 3:
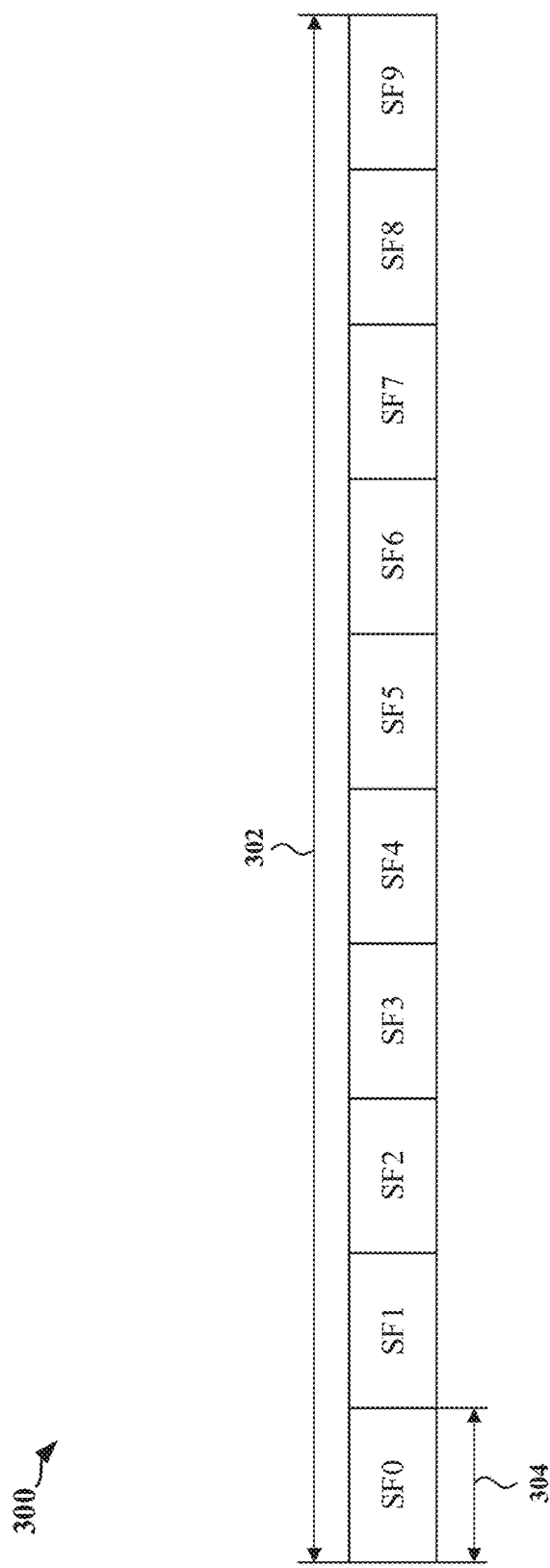
FIG. 3 illustrates a radio frame for wireless communication between the scheduling entity and the subordinate entity.

FIG. 3 illustrates an example of a radio frame 300 that may be used for wireless communication between the scheduling entity 202 and the subordinate entity 204. In an aspect of the present disclosure, the radio frame 300 may have a time duration 302. For example, the time duration 302 may be 5 ms. Further, the radio frame 300 may include one or more subframes (SFs). In the example configuration of FIG. 3, the radio frame 300 includes 10 subframes (e.g., labeled "SF0" to "SF9" in FIG. 3) that have the same time duration 304. For example, the time duration 304 may be 500 μs. However, within the scope of the present disclosure, a frame may include any suitable number of subframes, and each subframe may have any suitable duration. In some aspects of the present disclosure, one or more of the subframes SF0 to SF9 may be self-contained subframes, described below.

For example, FIG. 4 illustrates one example structure of a self-contained subframe 400. In the illustrated example, a subframe may be a transmitter-scheduled subframe, referred to herein as a downlink-centric subframe or DL-centric subframe, as more resources are allocated for transmissions in the downlink direction (e.g., transmissions from the scheduling entity 202 to the subordinate entity 204).

Each subframe, such as subframe 400, may include transmit (Tx) and receive (Rx) portions. For example, in the DL-centric subframe 400, the scheduling entity 202 first has an opportunity to transmit control information, e.g., on a physical downlink control channel (PDCCH) in the control information portion 402, and then an opportunity to transmit data information, e.g., on a physical downlink shared channel (PDSCH) in the DL data portion 404. Following a guard period (GP) portion 406 having a suitable duration 410, the scheduling entity 202 has an opportunity to receive an acknowledged (ACK)/not acknowledged (NACK) signal in the ACK portion 408 from other entities using the carrier. Here, a subframe such as the subframe 400 may be referred to as a self-contained subframe when all of the data carried in the data portion 404 of the subframe 400 is scheduled in the control portion 402 of the subframe, and further, when all of the data carried in the data portion 404 of the subframe 400 is acknowledged (or at least has an opportunity to be acknowledged) in the ACK portion 408 of the subframe 400. In this way, each self-contained subframe may be considered a self-contained entity, not necessarily requiring any other subframe to complete a scheduling-transmission-acknowledgment cycle for any given packet.

The GP portion 406 may be included to accommodate variability in UL and DL timing. For example, latencies due to radio frequency (RF) antenna direction switching (e.g., from DL to UL) and transmission path latencies may cause the subordinate entity 204 to transmit early on the UL to match DL timing. Such early transmission may interfere with symbols received from the scheduling entity 202. Accordingly, the GP portion 406 may allow an amount of time after the DL data portion 404 to prevent interference, where the GP portion 406 provides an appropriate amount of time for the scheduling entity 202 to switch its RF antenna direction, an appropriate amount of time for the over-the-air (OTA) transmission, and an appropriate amount of time for ACK processing by the subordinate entity.

Therefore, the GP portion 406 provides an appropriate amount of time for the subordinate entity 204 to switch its RF antenna direction (e.g., from DL to UL), to processes the data payload, and for the OTA transmission time. The duration of the GP portion 406 may be configured in terms of full symbol periods. For example, the GP portion 506 may have a duration of one full symbol period (e.g., 31.25 μs).

FIG. 5 illustrates another example structure of a self-contained subframe 500 (also referred to as DL-centric subframe 500). As seen, the structure of the DL-centric subframe 500 is essentially the same as that of the subframe 400 illustrated in FIG. 4 and described above, except for a timing advance (TA) command has been applied to the UL waveform (e.g., the ACK portion 508). With reference to the DL-centric subframe 500, the scheduling entity 202 first has an opportunity to transmit control information in the control information portion 502, and then an opportunity to transmit data information in the DL data portion 504. Following the GP portion 506, the scheduling entity has an opportunity to receive an ACK/NACK signal in the ACK portion 508 from other entities (e.g., subordinate entity 204) using the carrier. A second GP portion 510 is subsequent to the ACK portion 508.

A timing advance command may be sent from the scheduling entity 202 to the subordinate entity 204 in order to correct the timing of the subordinate entity 204 relative to a current timing of the subordinate entity 204. For example, in response to a TA command, the subordinate entity 204 may delay its timing (e.g., transmit later relative to the current timing of the subordinate entity 204) or advance its timing (e.g., transmit earlier relative to the current timing of the subordinate entity 204) to compensate for a propagation delay between the scheduling entity 202 and the subordinate entity 204. Therefore, in the example configuration of DL-centric subframe 500 in FIG. 5, a TA command has advanced the timing of the subordinate entity 204 such that the ACK portion 508 (e.g., UL portion) of the subframe is configured earlier relative to its current timing. As such, the GP duration 512 of GP portion 506 in FIG. 5 is reduced relative to the GP duration 410 of GP 406 in FIG. 4 (e.g., where no TA command is applied). In the example configuration of the DL-centric subframe 500 in FIG. 5, the period remaining in the DL-centric subframe 500 subsequent to the ACK portion 508 is allocated as a guard period (e.g., the second GP portion 510). Accordingly, the first duration 512 of GP portion 506 and the second duration 514 of the second GP portion 510 may each be less than one full symbol period.

One consequence of the timing advance illustrated in FIG. 5 is a compression of the processing timeline for calculating the acknowledgment information for transmission in the ACK portion 508. That is, the receiving subordinate entity 204 may apply a suitable error checking algorithm to packets received in the data portion 504, in order to determine whether to acknowledge or not those packets in the ACK portion 508. In order to timely process the data payload received during the DL data portion 504 to sustain stable throughput, the subordinate entity 204 will require sufficient processing time to generate the ACK symbols as the data payload is received. However, especially with the timing advance discussed above, since the GP portion 506 has a duration that may be less than one symbol period, the subordinate entity 204 may not have sufficient time to process the data payload received during the last full symbol in the DL data portion 504 before a control channel symbol is formed.

Figure 6:
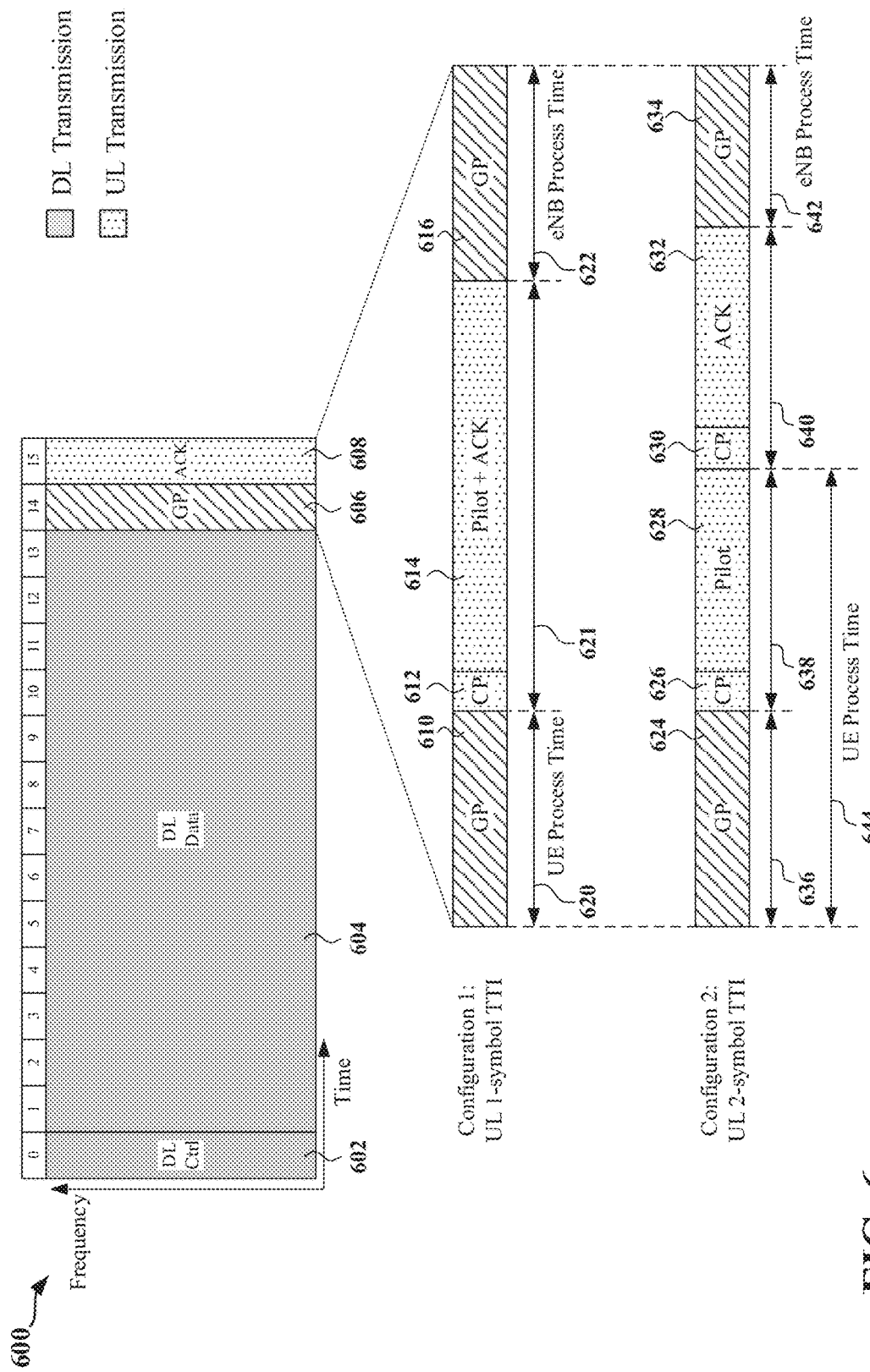
FIG. 6 illustrates the structure of a self-contained subframe in accordance with some aspects of the present disclosure.

FIG. 6 illustrates the structure of a self-contained subframe 600 in accordance with some aspects of the present disclosure. As shown in FIG. 6, the self-contained subframe 600 includes a control information portion 602, a DL data portion 604, a first GP portion 606, an ACK portion 608, and a second GP portion 609. As further shown in FIG. 6, the horizontal axis relative to the self-contained subframe 600 represents time and the vertical axis relative to the self-contained subframe 600 represents frequency. In the configuration of FIG. 6, the self-contained subframe 600 has a duration of 16 symbol periods (e.g., symbols 0 through 15 indicated at the top of the self-contained subframe 600). For example, each of the 16 symbol periods may be full OFDM symbol periods. Accordingly, the DL control information portion 602 has a duration of one full symbol period, the DL data portion 604 has a duration of 13 full symbol periods, the first guard period portion 606 has a duration that is less than one full symbol period, the ACK portion 608 has a duration of one full symbol period, and the second guard period portion 609 has a duration that is less than one full symbol period. The structure of the self-contained subframe 600 during symbols 14 and 15 may vary from this structure according to some aspects of the present disclosure. Here, the control information portion 602, DL data portion 604, the first GP portion 606, the ACK portion 608, and the second GP portion 609 in FIG. 6 respectively correspond to the control information portion 502, DL data portion 504, the first GP portion 506, the ACK portion 508, and the second GP portion 510 in FIG. 5.

As shown in FIG. 6, the scheduling entity 202 may configure the last two full symbols of the self-contained subframe 600 (e.g., symbols 14 and 15) using a first configuration or a second configuration. For example, the GP portion 610 may have a first duration 620 and the GP portion 616 may have a second duration 622. Here, the first duration 620 may represent the available processing time for the subordinate entity 204 and the second duration 622 may represent the available processing time for the scheduling entity 202. In one example, the first duration 620 and the second duration 622 may each be one half of a full symbol. Therefore, in one example, if one full symbol is configured to have a duration of approximately 33.0 us, the first and second durations 620, 622 may each be approximately 16.5 μs. As shown in FIG. 6, the ACK portion 608 may be configured as the pilot and ACK portion 614 that includes a pilot signal and an ACK/NACK signal, and a cyclic prefix (CP) portion 612 that includes a CP. For example, the third duration 621 may be equal to one full symbol period.

In order for the subordinate entity 204 to process the portion of the data payload received during the last full symbol (e.g., symbol 13) in DL data portion 604, the subordinate entity 204 may require an amount of processing time that is greater than or equal to the approximate duration of the last full symbol (e.g., the required processing time may be less than a full symbol duration, but relatively close to a full symbol duration, e.g., within about 10% of a full symbol duration). However, since the first duration 620 of the GP portion 610 in configuration 1 is less than the duration of one full symbol period, the first duration 620 may not provide the subordinate entity 204 a sufficient amount of processing time. It should be understood that in the example of FIG. 6, with configuration 1, the subordinate entity 204 is configured to complete processing of the entire data payload received in the DL data portion 604 prior to configuring and transmitting the pilot and ACK/NACK signal in the pilot and ACK portion 614 and the CP in the CP portion 612.

In the second configuration (also referred to as configuration 2), the ACK portion 608 may be configured as two separate scaled symbols (also referred to as short symbols or scaled symbols) that are each shorter in duration than one full symbol period. For example, the ACK portion 608 may be configured as a first scaled symbol 625 including a CP portion 626 and a pilot signal portion 628, and as a second scaled symbol 629 that includes a CP portion 630 and an ACK portion 632. As shown in FIG. 6, with configuration 2, the first scaled symbol 625 may have a third duration 638 and the second scaled symbol 629 may have a fourth duration 640. In some examples, the third duration 638 may be different from the fourth duration 640. In a further example, the total of the first duration 636 and the third duration 638 may be greater than or equal to one full symbol period. For example, the total of the first duration 636 and the third duration 638 may be 33.86 μs. In a further aspect of the disclosure, the overhead introduced by the CP in the CP portion 630 may be reduced by reducing the size of the CP or by omitting the CP.

In this way, by time dividing the pilot from the ACK portions, the subordinate entity 204 is not required to complete processing of the entire data payload received in the DL data portion 604 prior to configuring and transmitting a pilot signal. As such, the subordinate entity 204 may use the third duration 638 of the first scaled symbol 625 in addition to the first duration 636 of the first GP portion 624 to process the portion of the data payload received during the last full symbol (e.g., symbol 13) in the DL data portion 604. Since the total (e.g., fifth duration 644) of the first duration 636 and the third duration 638 may be greater than or equal to one full symbol period, configuration 2 provides the subordinate entity 204 adequate time to process the portion of the data payload received during the last full symbol (e.g, symbol 13) prior to configuring and transmitting the CP in the CP portion 630 and the ACK/NACK signal in the ACK portion 632. It should be noted that although the second duration 642 is less than one full symbol period, the second duration 642 of the second GP portion 634 can still provide the scheduling entity 202 adequate time to switch its RF antenna direction and for any associated overhead involved in performing such switching of its RF antenna direction. For example, the second duration 642 may be 12.2 μs.

In an aspect of the present disclosure, the total UL transmission power for the pilot signal in the pilot signal portion 628 and the ACK/NACK signal in the ACK portion 632 of configuration 2 may be equal to the UL transmission power for the pilot and ACK/NACK signal of the pilot and ACK portion 614 in configuration 1. In another aspect of the disclosure, configuration 2 may provide a lower peak to average power ratio (PAPR) than configuration 1. In some examples, the pilot signal of the pilot signal portion 628 may be used for automatic gain control training. In some examples, the sampling rate of the pilot signal in the pilot signal portion 628 and the sampling rate of the ACK/NACK signal in 608 may be the same as the sampling rate of the pilot and ACK/NACK signal in the pilot and ACK portion 614.

In a further aspect of the disclosure, the same structure applied in the self-contained subframe 600 in FIG. 6 may be applied to UL control and data. Alternatively, UL control and data may be based on differently scaled symbol structures. For example, the data and control symbols may be separated by a guardband. As another example, weighted overlap and add (WOLA) may be applied to the data and control symbols to control inter-carrier interference (ICI).

In configuration 2 of FIG. 6, one or more of the scaled symbols (e.g., third and fourth durations 638, 640) may be configured to omit the CP to reduce overhead. Moreover, each scaled symbol may achieve fine granularity for low-latency/fast TDD switching without substantially increasing the nominal CP overhead. It should be noted that in conventional TDD frame structures, the duration of GP portions are configured based on a number of full OFDM symbol(s). As such, the overhead (e.g., duration) allocated for DL/UL switching in such conventional TDD frame structures is based on one or more full OFDM symbol durations, and not the actual time required to perform DL/UL switching and any propagation delay period between a scheduling entity and a subordinate entity. For example, the actual DL/UL switching overhead may be determined based on equation 1:

$$\text{DL/UL switching overhead} = \text{RF switching time} + 2*\text{OTA delay} \quad \text{(equation 1)}$$

where the DL/UL switching overhead represents the actual DL/UL switch duration of the scheduling entity 202, RF switching time represents the duration required for the scheduling entity 202 to change its RF antenna direction, and the OTA delay represents the propagation delay between the scheduling entity 202 and the subordinate entity 204. For example, if the RF switching time for a scheduling entity 202 is 5.0 μs and the OTA delay value with respect to a subordinate entity 204 at 1.0 km from the scheduling entity 202 is 3.3 μs, then the DL/UL switching overhead for the scheduling entity 202 may be determined to be 11.3 μs (e.g., 5.0 μs+2(3.3 μs)). It should be noted that the term "2 * OTA delay" represents the round trip time (RTT) of a signal. Therefore, the allocation of a GP portion having a duration of one full OFDM symbol (e.g., 70.0 μs or 31.25 μs) as done in conventional TDD frame structures may be substantially more than the actual DL/UL switching overhead (e.g., 11.3 μs). Additional data may be transmitted with a scaled symbol of the nominal symbol (e.g. ½). The same technique applies when an extended CP (e.g., for a larger cell radius) is implemented.

In one example, the scheduling entity 202 may apply a TA command of 30 μs for users (e.g., subordinate entities 204) on the cell edge. In this case, a self-contained subframe structure may be designed where the number of symbols in the UL portion is a function of the OTA delay between subordinate entity (e.g., subordinate entity 204) and the scheduling entity (e.g., scheduling entity 202). Users at the cell edge may have fewer UL symbols, providing a sufficient gap for the OTA delay. Users near the scheduling entity 202 may utilize more UL symbols to achieve a higher throughput.

Figure 7:
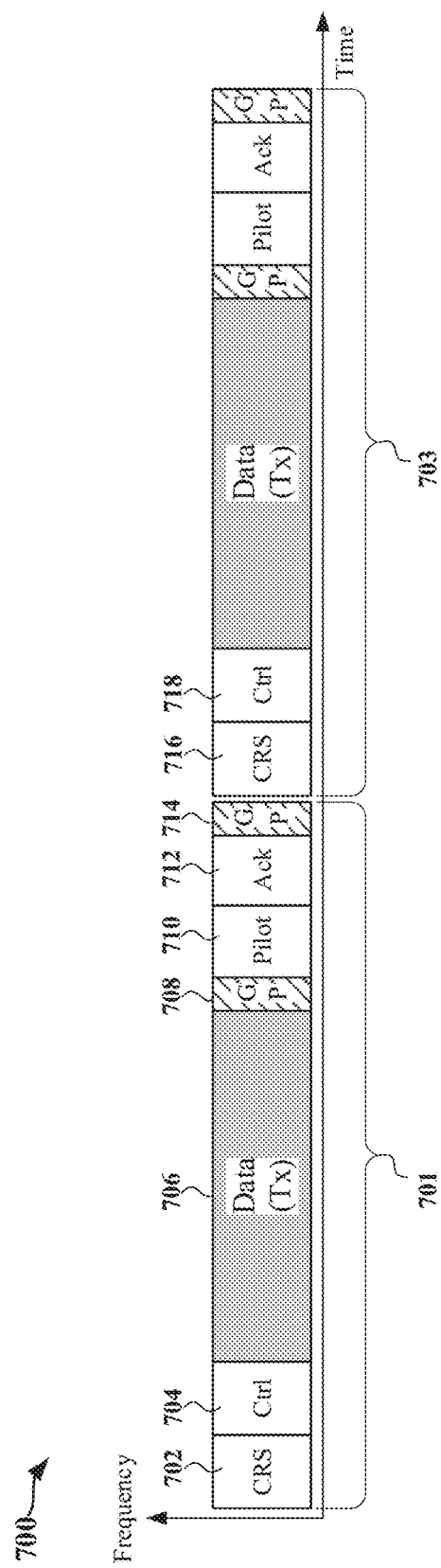
FIG. 7 illustrates the structure of self-contained subframes in accordance with some aspects of the present disclosure.

FIG. 7 illustrates the structure of self-contained subframes 701 and 703 in accordance with some aspects of the present disclosure. A transmitter-scheduled subframe, referred to herein as a downlink-centric subframe or DL-centric subframe, may be used to carry a cell specific reference signal (CRS), control information, data information and/or scheduling information to a subordinate entity (e.g., subordinate entity 204), which may be a UE for example.

Each subframe in FIG. 7 is divided into transmit (Tx) and receive (Rx) portions. In the DL-centric subframe 701, the scheduling entity 202 first has an opportunity to transmit the CRS in the CRS portion 702, control information in the control information portion 704, and an opportunity to transmit data information in the DL data portion 706. Following a guard period (GP) portion 708, the scheduling entity has an opportunity to receive a pilot signal in pilot signal portion 710 and an ACK/ NACK signal in the ACK portion 712 from other entities using the carrier. A GP portion 714 is subsequent to the ACK portion 712. This frame structure is downlink-centric, as more resources are allocated for transmissions in the downlink direction (e.g., transmissions from the scheduling entity 202 to the subordinate entity 204). As shown in FIG. 7, the DL-centric subframe 703 is configured similar to DL-centric subframe 701.

From the perspective of the subordinate entity 204, the UL pilot signal in the pilot signal portion 710 may be formed without completing processing of the data information received in the DL data portion 706. That is, formation of the ACK/NACK signal depends upon the results of the data processing. In the configuration of FIG. 7, the pilot signal portion 710 and the ACK portion 712 are configured by splitting an ACK/NACK symbol having a duration of one full OFDM symbol into two scaled symbols. The two scaled symbols (e.g., the pilot signal portion 710 and the ACK portion 712) help to extend the subordinate entity processing timeline by a duration of one half of a full OFDM symbol.

From the perspective of the scheduling entity 202, the DL CRS waveform (e.g., CRS in the CRS portion 716) may be formed without completing processing of the ACK/NACK signal received from the subordinate entity 204 in the ACK portion 712. In one example, only formation of the control information signal depends upon the results of the data processing. In the configuration of FIG. 7, the CRS portion 716 and the control information portion 718 are configured by splitting a PDCCH control symbol having a duration of one full OFDM symbol into two scaled symbols. The two scaled symbols (e.g., the CRS portion 716 and the control information portion 718) help to extend the scheduling entity processing timeline by a duration of one half of a full OFDM symbol. However, in some examples, the split symbol may require separate CP overhead for the first two symbols, which would in turn eat into the GP in the same TTI.

Figure 8:
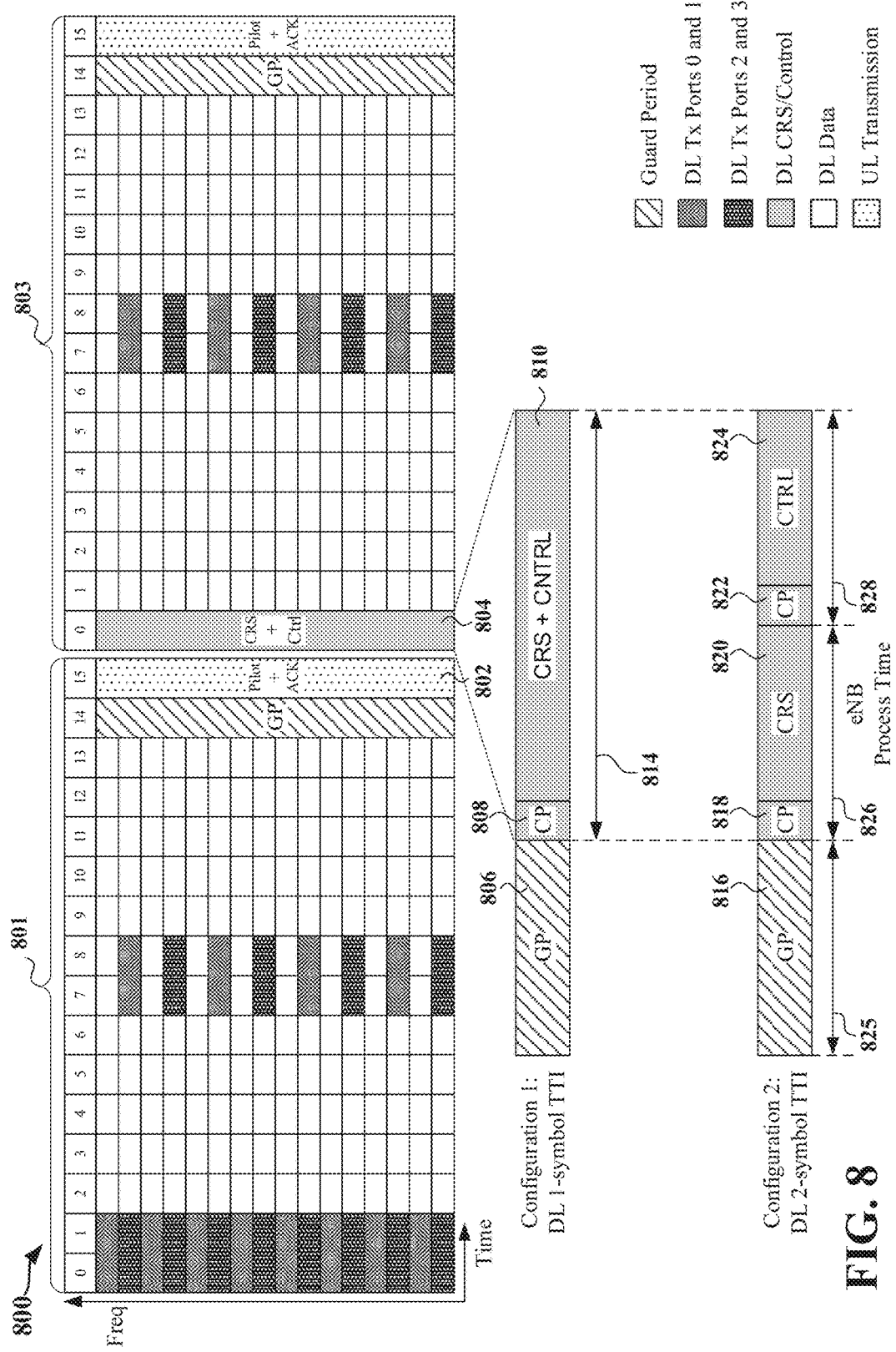
FIG. 8 is a diagram illustrating the structure of self-contained subframes in accordance with some aspects of the present disclosure.

In a further aspect of the disclosure, a similar technique may be applied to the first symbol or symbols of a subframe, to relax the processing timeline at the scheduling entity 202. For example, FIG. 8 is a diagram 800 illustrating another example of the structure of self-contained subframes 801 and 803 in accordance with some aspects of the present disclosure. The self-contained subframe 801 includes a control information portion (e.g., symbol 0), DL data portion (e.g., symbols 2-6 and 9-13), GP portion (e.g., symbol 14), and a pilot and ACK portion 802 (e.g., symbol 15). As shown in FIG. 8, the horizontal axis relative to the self-contained subframes 801 and 803 represents time and the vertical axis relative to the self-contained subframes 801 and 803 represents frequency. In the configuration of FIG. 8, the self-contained subframe 801 has a duration of 16 symbol periods (e.g., symbols 0 through 15 indicated at the top of the self-contained subframe 801). For example, each of the 16 symbol periods may be full OFDM symbol periods.

As shown in FIG. 8, the scheduling entity 202 may receive a pilot and an ACK/NACK signal from the subordinate entity 204 in pilot and ACK portion 802 of the self-contained subframe 801. In the subsequent self-contained subframe 803, the scheduling entity 202 may configure the first symbol 804 (e.g., symbol 0) using a first configuration or a second configuration. For example, in the first configuration (also referred to as configuration 1), the first symbol 804 (e.g., symbol 0) may be configured to include a CP 808 and a cell specific reference signal (CRS) and control information portion 810 that includes a CRS and control information (Ctrl). In one example, a GP portion 806 may precede the first symbol 804. In configuration 1, the first duration 814 of the CP 808 and the CRS and control information portion 810 may be approximately one full OFDM symbol period. In another example, the first two symbols may have a scaled numerology or subcarrier spacing relative to the nominal symbol, where each requires a CP of the same length as nominal symbol, which will reduce the GP duration in the TTI.

In order for the scheduling entity 202 to process the ACK/NACK signal received in the pilot and ACK portion 802 of the self-contained subframe 801, the scheduling entity 202 may require an amount of processing time that is greater than or equal to the duration of the pilot and ACK portion 802 (e.g., the duration of symbol 15 in self-contained subframe 801 or less than the duration of symbol 15 if less than one full symbol is allocated for transmission of the ACK/NACK signal). However, the duration of the GP portion 806 in configuration 1 may be less than the duration of one full OFDM symbol period, which may not provide the scheduling entity 202 the required processing time. It should be understood that the scheduling entity 202 completes processing of the ACK/NACK signal received in the pilot and ACK portion 802 before configuring and transmitting the CP 808 and the CRS and control information in the CRS and control information portion 810.

In the second configuration (also referred to as configuration 2), for example, the first symbol 804 may be split into and configured as two separate scaled symbols (also referred to as short symbols or partial symbols) that are each shorter in duration than one full OFDM symbol period. For example, the first symbol 804 may be configured as a first scaled symbol 817 including a CP portion 818 and a CRS portion 820, and as a second scaled symbol 821 that includes a CP portion 822 and a control portion 824. As shown in FIG. 8, the first scaled symbol 817 may have a first duration 826 and the second scaled symbol 821 may have a second duration 828. In some examples, the first duration 826 may be different from the second duration 828. In some examples, the total of the first duration 826 and the second duration 828 may be greater than or equal to one full OFDM symbol period. For example, the total of the first duration 826 and the second duration 828 may be 33.86 µs. In some examples, the overhead introduced by the CP in the CP portion 822 may be reduced by reducing the size of the CP or by omitting the CP.

The scheduling entity is not required to complete processing of the ACK/NACK signal received in the pilot and ACK portion 802 prior to configuring and transmitting the CRS. As such, the scheduling entity 202 may use the first duration 826 of the first scaled symbol 817 in addition to the GP duration 825 in the GP portion 816 to process the ACK/NACK signal (or other information) received during the last full symbol (e.g., symbol 15) in self-contained subframe 801. Since the total of the GP duration 825 and the first duration 826 may be greater than or equal to one full OFDM symbol period (or greater than or equal to a duration of a scaled symbol used to transmit the ACK/NAK signal), configuration 2 can provide the scheduling entity 202 adequate time to process the ACK/NACK signal (or other information) received from the subordinate entity 204 during the last symbol (e.g., symbol 15) prior to configuring and transmitting the CP in the CP portion 822 and the control information in the control portion 824.

The manner in which one full OFDM symbol may be scaled down to provide multiple scaled symbols is described in greater detail with respect to the example configurations in FIGS. 9 and 10 below.

Figure 9:
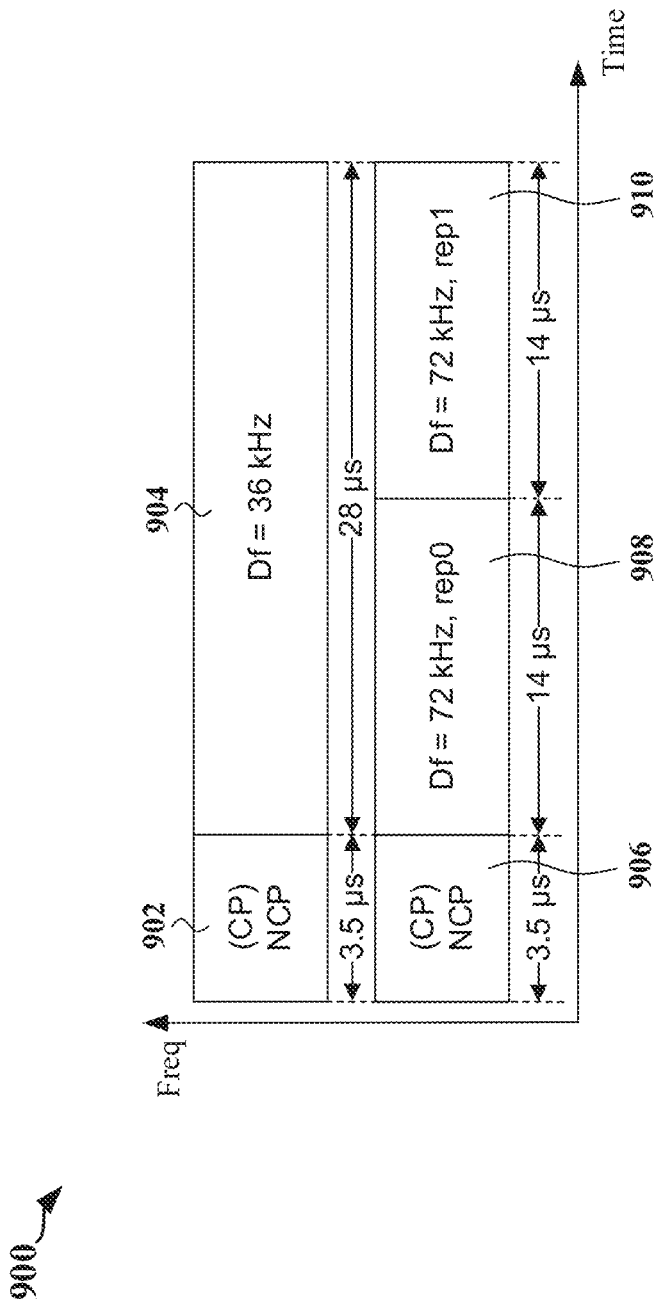
FIG. 9 is a diagram illustrating an example symbol structure implementing scaled symbols.

FIG. 9 is a diagram illustrating an example symbol structure implementing scaled symbols (also referred to as short symbols or partial symbols) according to some aspects of the present disclosure. FIG. 9 shows a full OFDM symbol 904 having a duration of 28 µs with a normal cyclic prefix (NCP) 902 having a duration of 3.5 µs. As shown in FIG. 9, the full OFDM symbol 904 has a subcarrier spacing (Df) of 36 kHz. As further shown in FIG. 9, the full OFDM symbol 904 may be scaled (e.g., divided) down by a factor of two to generate two scaled symbols 908 and 910 with an NCP 906. Accordingly, each of the two scaled symbols 908 and 910 has a duration of 14 µs, but with a wider subcarrier spacing (e.g., 72 kHz) than the full OFDM symbol 904.

Figure 10:
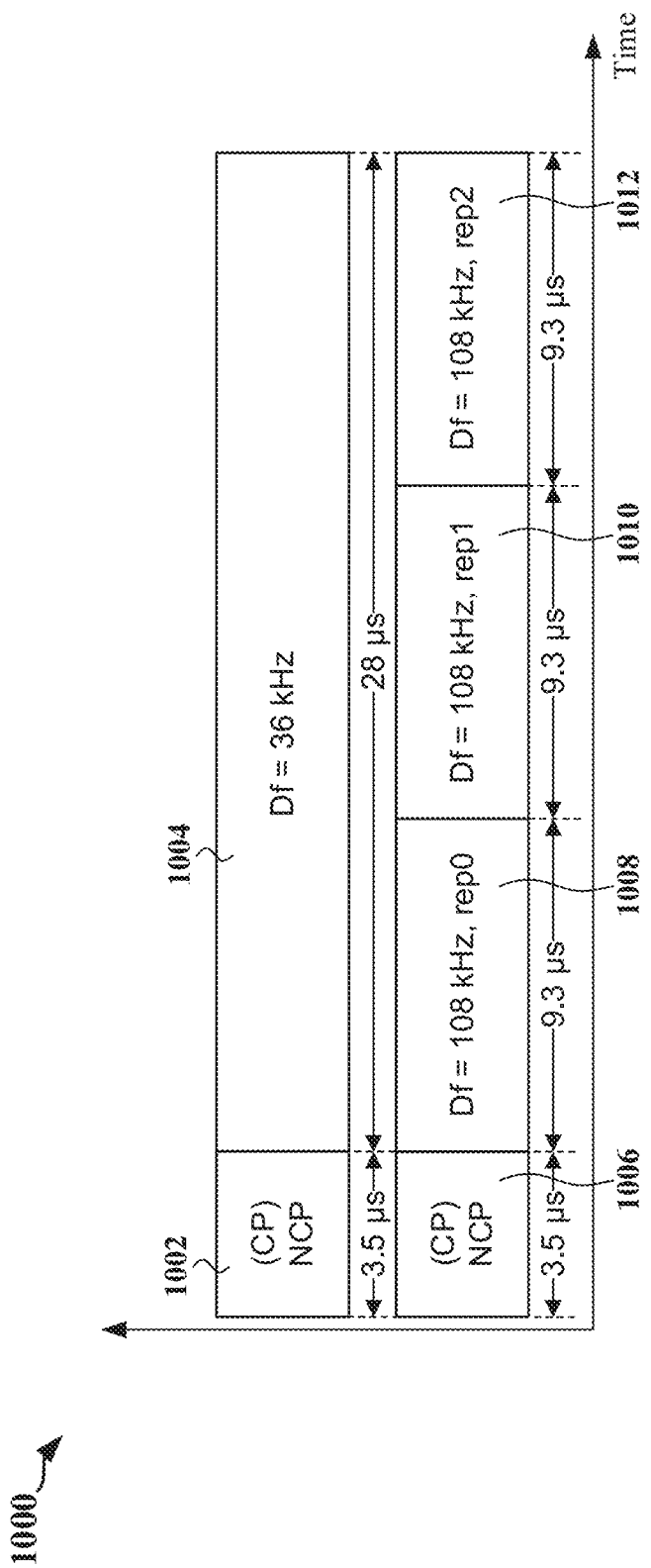
FIG. 10 is a diagram illustrating an example symbol structure implementing scaled symbols.

FIG. 10 is a diagram illustrating a symbol structure implementing another example of scaled symbols according to some aspects of the present disclosure. FIG. 10 shows a full OFDM symbol 1004 having a duration of 28 µs with an NCP 1002 having a duration of 3.5 µs. As shown in FIG. 10, the full OFDM symbol 1004 has a subcarrier spacing of 36 kHz. As further shown in FIG. 10, the full OFDM symbol may be scaled (e.g., divided) down by a factor of three to generate three scaled symbols 1008, 1010, and 1012 with an NCP 1006. Accordingly, each of the scaled symbols 1008, 1010, and 1012 has a duration of approximately 9.3 µs, but with a wider subcarrier spacing (e.g., 108 kHz) than the full OFDM symbol 1004.

In one example, every other tone in one full OFDM symbol may be zero and the full OFDM symbol may generate a periodic time domain waveform. In one example, a transmitter (e.g., subordinate entity 204) may synchronously transmit a portion of a waveform, which may be sufficient to ensure demodulation and decoding without intercarrier interference (ICI) and/or intersymbol interference (ISI). A receiver (e.g., scheduling entity 202) may receive and process the portion of the waveform (e.g., the scaled symbol) using a smaller fast Fourier transform (FFT) size or using zero padding or waveform repetition. Such example allows half usable tones in one full OFDM symbol at half of the power of the full OFDM symbol. For example, and as described below with reference to FIG. 10, one full OFDM symbol may be split into three separate symbols to form a DL scaled symbol, a UL scaled symbol, and a GP scaled symbol, where the size of the DL scaled symbol is one half of the full OFDM symbol, the size of the UL scaled symbol is one quarter of the full OFDM symbol, and the size of the GP is one quarter of the full OFDM symbol. For example, one quarter of the full OFDM symbol may have a duration of 6.0 µs.

The scaled symbols disclosed herein provide fine symbol granularity to achieve efficient DL/UL switching. Synchronous transmission effectively manages UL/DL interference. Therefore, by implementing the various aspects disclosed herein, a scheduling entity and/or a subordinate entity may substantially reduce the DL/UL switching time. For example, since the DL/UL switching time is typically rounded up to one full OFDM symbol in conventional schemes, the use of scaled symbols as disclosed herein may reduce DL/UL switching times to one half of the duration of a full OFDM symbol or shorter. As such, a 50% reduction or more in DL/UL switching overhead may be achieved. For example, the duration of one full OFDM symbol may be scaled down to serve as a scaled DL symbol, DL/UL switch period, and a scaled UL symbol. The same technique may be applied to gain ACK/Ctrl decoding timeline to achieve a fast HARQ turnaround.

Figure 11:
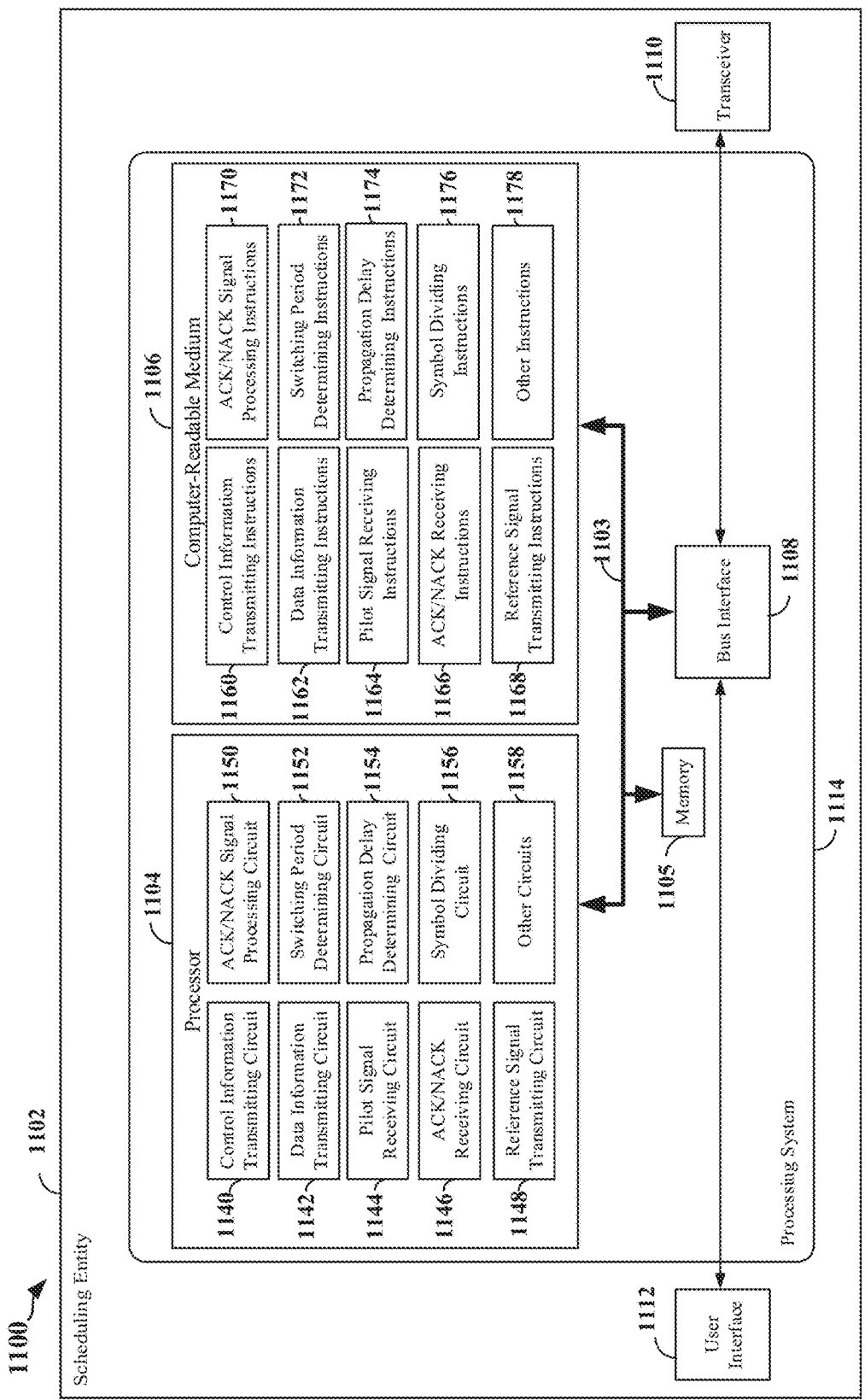
FIG. 11 is a diagram illustrating an example of a hardware implementation of an apparatus 1102 according to some aspects of the present disclosure.

FIG. 11 is a diagram illustrating an example of a hardware implementation of an apparatus 1102 according to various aspects of the present disclosure. Generally, the apparatus 1102 may be any device configured for wireless communication. In some configurations, the apparatus 1102 may be the scheduling entity 202, as described above. The apparatus 1102 may include a user interface 1112. The user interface 1112 may be configured to receive one or more inputs from a user of the apparatus 1102. The user interface 1112 may also be configured to display information to the user of the apparatus 1102. The user interface 1112 may exchange data via the bus interface 1108.

The apparatus 1102 may also include a transceiver 1110. The transceiver 1110 may be configured to receive data and/or transmit data in communication with another apparatus. The transceiver 1110 provides a means for communicating with another apparatus via a wired or wireless transmission medium. In some configurations, the transceiver 1110 may provide the means for communicating with various other apparatus over a transmission medium. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 1110 may provide the apparatus 1102 with the means for transmitting data (e.g., control information, data information, and/or reference signals) to the subordinate entity 204 as well as the means for receiving data (e.g., pilot signals, ACK/NACK signals) from subordinate entity 204. The transceiver 1110 may be configured to perform such communications using various types of technologies, as described in greater detail above. One of ordinary skill in the art will understand that many types of technologies may perform such communication without deviating from the scope of the present disclosure.

The apparatus 1102 may also include a memory 1105, one or more processors 1104, a computer-readable medium 1106, and a bus interface 1108. The bus interface 1108 may provide an interface between a bus 1103 and the transceiver 1110. The memory 1105, the one or more processors 1104, the computer-readable medium 1106, and the bus interface 1108 may be connected together via the bus 1103. The processor 1104 may be communicatively coupled to the transceiver 1110 and/or the memory 1105.

The processor 1104 may include a control information transmitting circuit 1140. In one example, the control information transmitting circuit 1140 may include various hardware components and/or may perform various algorithms that provide the means for transmitting control information in a control portion of a subframe, the control information corresponding to data information within the subframe. In another example, the control information transmitting circuit 1140 may include various hardware components and/or may perform various algorithms that provide the means for transmitting control information in a control information portion of a second subframe that is subsequent to the reference signal portion of the second subframe, wherein a duration of the control information portion is less than the duration of a full symbol in the second subframe.

The processor 1104 may also include a data information transmitting circuit 1142. The data information transmitting circuit 1142 may include various hardware components and/or may perform various algorithms that provide the means for transmitting the data information in a data portion of a subframe.

The processor 1104 may also include a pilot signal receiving circuit 1144. The pilot signal receiving circuit 1144 may include various hardware components and/or may perform various algorithms that provide the means for receiving a pilot signal from the set of subordinate entities in a pilot portion of the subframe.

The processor 1104 may also include an ACK/NACK signal receiving circuit 1146. In one example, the ACK/NACK signal receiving circuit 1146 may include various hardware components and/or may perform various algorithms that provide the means for receiving an ACK/NACK signal from the set of subordinate entities in an ACK portion of the subframe, the ACK portion being subsequent to the pilot portion of the subframe, the ACK/NACK signal including acknowledgment information corresponding to the data information. In another example, the ACK/NACK signal receiving circuit 1146 may include various hardware components and/or may perform various algorithms that provide the means for receiving a first ACK/NACK signal from a set of subordinate entities in a first subframe. In such example, the ACK/NACK signal receiving circuit 1146 may also include various hardware components and/or may perform various algorithms that provide the means for receiving a second ACK/NACK signal from the set of subordinate entities in an ACK portion of the second subframe, the second ACK/NACK signal comprising acknowledgment information corresponding to the data information.

The processor 1104 may also include a reference signal transmitting circuit 1148. The reference signal transmitting circuit 1148 may include various hardware components and/or may perform various algorithms that provide the means for transmitting a reference signal in a reference signal portion of a second subframe, where a duration of the reference signal portion is less than a duration of a full symbol in the second subframe.

The processor 1104 may also include an ACK/NACK signal processing circuit 1150. The ACK/NACK signal processing circuit 1150 may include various hardware components and/or may perform various algorithms that provide the means for processing a first ACK/NACK signal during a duration of a reference signal portion of a second subframe.

The processor 1104 may also include a switching period determining circuit 1152. The switching period determining circuit 1152 may include various hardware components and/or may perform various algorithms that provide the means for determining a DL to UL switching period associated with the one or more subordinate entities.

The processor 1104 may also include a propagation delay determining circuit 1154. The propagation delay determining circuit 1154 may include various hardware components and/or may perform various algorithms that provide the means for determining a signal propagation delay period between the scheduling entity and the one or more subordinate entities.

The processor 1104 may also include a symbol dividing circuit 1156. The symbol dividing circuit 1156 may include various hardware components and/or may perform various algorithms that provide the means for dividing a full symbol in a subframe into a plurality of scaled symbols, at least one of the plurality of scaled symbols having a duration that is equal to or greater than a total of the DL to UL switching period and the signal propagation delay period.

The foregoing description provides a non-limiting example of the processor 1104 of the apparatus 1102. Although various circuits 1140, 1142, 1144, 1146, 1148, 1150, 1152, 1154, and 1156 are described above, one of ordinary skill in the art will understand that the processor 1104 may also include various other circuits 1158 that are in addition and/or alternative(s) to the aforementioned circuits 1140, 1142, 1144, 1146, 1148, 1150, 1152, 1154, and 1156. Such other circuits 1158 may provide the means for performing any one or more of the functions, methods, processes, features and/or aspects described herein.

The computer-readable medium 1106 may include various computer-executable instructions. The computer-executable instructions may include computer-executable code configured to perform various functions and/or enable various aspects described herein. The computer-executable instructions may be executed by various hardware components (e.g., the processor 1104 and/or any of its circuits 1140, 1142, 1144, 1146, 1148, 1150, 1152, 1154, 1156, and 1158) of the apparatus 1102. The computer-executable instructions may be a part of various software programs and/or software modules.

The computer-readable medium 1106 may include control information transmitting instructions 1160. In one example, the control information transmitting instructions 1160 may include computer-executable instructions configured for transmitting control information in a control portion of a subframe, the control information corresponding to data information within the subframe. In another example, the control information transmitting instructions 1160 may include computer-executable instructions configured for transmitting control information in a control information portion of a second subframe that is subsequent to the reference signal portion of the second subframe, wherein a duration of the control information portion is less than the duration of a full symbol in the second subframe.

The computer-readable medium 1106 may also include data information transmitting instructions 1162. The data information transmitting instructions 1162 may include computer-executable instructions configured for transmitting the data information in a data portion of a subframe.

The computer-readable medium 1106 may also include pilot signal receiving instructions 1164. The pilot signal receiving instructions 1164 may include computer-executable instructions configured for receiving a pilot signal from the set of subordinate entities in a pilot portion of the subframe.

The computer-readable medium 1106 may also include ACK/NACK signal receiving instructions 1166. In one example, the ACK/NACK signal receiving instructions 1166 may include computer-executable instructions configured for receiving an ACK/NACK signal from the set of subordinate entities in an ACK portion of the subframe, the ACK portion being subsequent to the pilot portion of the subframe, the ACK/NACK signal including acknowledgment information corresponding to the data information. In another example, the ACK/NACK signal receiving instructions 1166 may include computer-executable instructions configured for receiving a first ACK/NACK signal from a set of subordinate entities in a first subframe. In such example, the ACK/NACK signal receiving instructions 1166 may also include computer-executable instructions configured for receiving a second ACK/NACK signal from the set of subordinate entities in an ACK portion of the second subframe, the second ACK/NACK signal comprising acknowledgment information corresponding to the data information.

The computer-readable medium 1106 may also include reference signal transmitting instructions 1168. The reference signal transmitting instructions 1168 may include computer-executable instructions configured for transmitting a reference signal in a reference signal portion of a second subframe, where a duration of the reference signal portion is less than a duration of a full symbol in the second subframe.

The computer-readable medium 1106 may also include ACK/NACK signal processing instructions 1170. The ACK/NACK signal processing instructions 1170 may include computer-executable instructions configured for processing a first ACK/NACK signal during a duration of a reference signal portion of a second subframe.

The computer-readable medium 1106 may also include switching period determining instructions 1172. The switching period determining instructions 1172 may include computer-executable instructions configured for determining a DL to UL switching period associated with the one or more subordinate entities.

The computer-readable medium 1106 may also include propagation delay determining instructions 1174. The propagation delay determining instructions 1174 may include computer-executable instructions configured for determining a signal propagation delay period between the scheduling entity and the one or more subordinate entities.

The computer-readable medium 1106 may also include symbol dividing instructions 1176. The symbol dividing instructions 1176 may include computer-executable instructions configured for dividing a full symbol in a subframe into a plurality of scaled symbols, at least one of the plurality of scaled symbols having a duration that is equal to or greater than a total of the DL to UL switching period and the signal propagation delay period.

The foregoing description provides a non-limiting example of the computer-readable medium 1106 of the apparatus 1102. Although various computer-executable instructions 1160, 1162, 1164, 1166, 1168, 1170, 1172, 1174, and 1176 are described above, one of ordinary skill in the art will understand that the computer-readable medium 1106 may also include various other computer-executable instructions 1178 that are in addition and/or alternative(s) to the aforementioned computer-executable instructions 1160, 1162, 1164, 1166, 1168, 1170, 1172, 1174, and 1176. Such other computer-executable instructions 1178 may be configured for any one or more of the functions, methods, processes, features and/or examples described herein.

The memory 1105 may include various memory modules. The memory modules may be configured to store, and have read therefrom, various values and/or information by the processor 1104, or any of its circuits 1140, 1142, 1144, 1146, 1148, 1150, 1152, 1154, 1156, and 1158. The memory modules may also be configured to store, and have read therefrom, various values and/or information upon execution of the computer-executable code included in the computer-readable medium 1106, or any of its instructions 1160, 1162, 1164, 1166, 1168, 1170, 1172, 1174, and 1176. The memory 1105 may include the previously discussed data information, control information, and/or a duration of a full symbol in a subframe. The foregoing description provides a non-limiting example of the memory 1105 of the apparatus 1102. Although various types of data of the memory 1105 are described above, one of ordinary skill in the art will understand that the memory 1105 may also include various other data that are in addition and/or alternative(s) to the aforementioned data. Such other data may be associated with any one or more of the functions, methods, processes, features and/or examples described herein.

Figure 12:
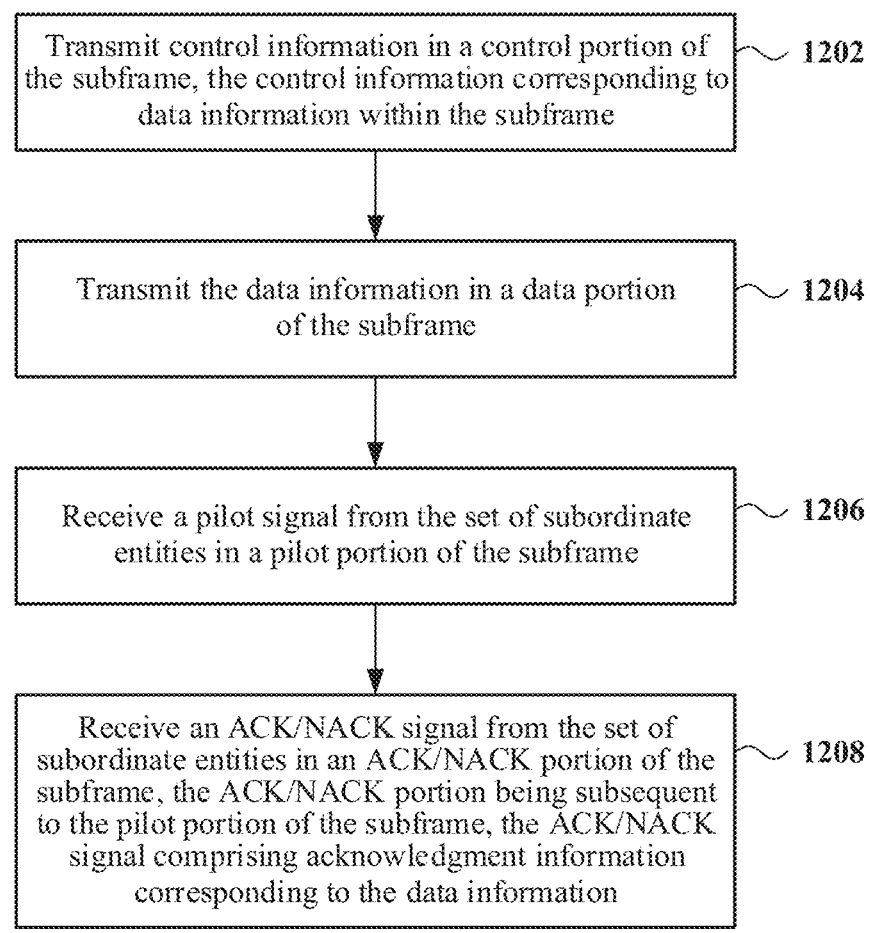
FIG. 12 is a diagram illustrating an example of various methods and/or processes according to aspects of the present disclosure.

FIG. 12 is a diagram 1200 illustrating an example of various methods and/or processes according to some aspects of the present disclosure. The methods and/or processes may be performed by an apparatus. In some configurations, such an apparatus is the apparatus 1102 described above with reference to FIG. 11. In some configurations, such an apparatus is scheduling entity 202 (described above).

At block 1202, the apparatus transmits control information in a control portion of the subframe, the control information corresponding to data information within the subframe. For example, with reference to FIG. 6, the control portion may be the control information portion 602. Here, when control information corresponds to data information, broadly, this may refer to the control information providing scheduling information for scheduling resources corresponding to the data information; modulation and coding information, or other information relating to the data information to enable a receiving device to receive and decode the data information; status information relating to the data information, such as whether the data information is a retransmission; or other similar control information as would be recognized by those of ordinary skill in the art.

At block 1204, the apparatus transmits the data information in a data portion of the subframe. For example, with reference to FIG. 6, the data portion may be the DL data portion 604.

At block 1206, the apparatus receives a pilot signal from the set of subordinate entities in a pilot portion of the subframe. For example, with reference to FIG. 6, the pilot portion may be the first scaled symbol 625.

At block 1208, the apparatus receives an ACK/NACK signal from the set of subordinate entities in an ACK portion of the subframe, the ACK portion being subsequent to the pilot portion of the subframe, the ACK/NACK signal including acknowledgment information corresponding to the data information. For example, with reference to FIG. 6, the ACK portion may be the second scaled symbol 629. Here, when the ACK/NACK signal includes acknowledgment information corresponding to the data information, broadly, this refers to the ACK/NACK being configured to acknowledge, or not, the decoding and verification of corresponding packets or transport blocks included in the data information.

Figure 13:
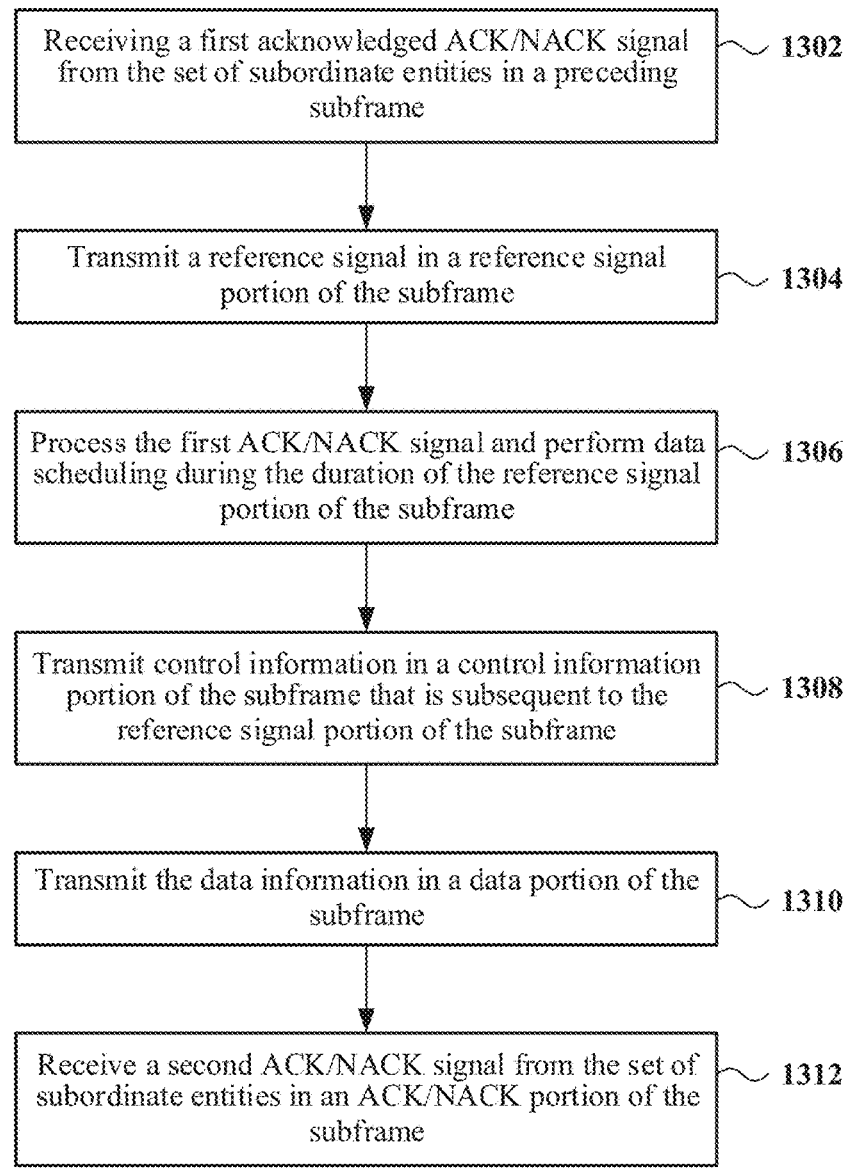
FIG. 13 is a diagram illustrating an example of various methods and/or processes according to aspects of the present disclosure.

FIG. 13 is a diagram 1300 illustrating an example of various methods and/or processes according to some aspects of the present disclosure. The methods and/or processes may be performed by an apparatus. In some configurations, such an apparatus is the apparatus 1102 described above with reference to FIG. 11. In some configurations, such an apparatus is scheduling entity 202 (described above).

At block 1302, the apparatus receives a first ACK/NACK signal from the set of subordinate entities in a preceding subframe. For example, with reference to FIG. 8, the apparatus may receive a pilot and ACK/NACK signal from a subordinate entity in symbols 14 and/or 15 of the subframe 801. Therefore, in this example, the subframe 801 may be considered a preceding subframe with respect to subframe 803.

At block 1304, the apparatus transmits a reference signal in a reference signal portion of the subframe. In one example, the reference signal may be a CRS. In another example, the reference signal may be a demodulation reference signal (DMRS) or channel state information reference signal (CSI-RS). For example, with reference to FIG. 8, the apparatus may transmit a CRS, DMRS, and/or CSI-RS in the reference signal portion 820 of the subframe 803. In one example, a duration of the reference signal portion 820 is less than the duration of one symbol in the subframe.

At block 1306, the apparatus processes the first ACK/NACK signal during the duration of the reference signal portion of the subframe. For example, with reference to FIG. 8, the apparatus may process the first ACK/NACK signal during the first duration 826 of the first scaled symbol 817.

At block 1308, the apparatus transmits control information in a control information portion of the subframe that is subsequent to the reference signal portion of the subframe. For example, with reference to FIG. 8, the apparatus may transmit control information in the control portion 824 of the subframe 803. In one example, a duration of the control information portion 824 is less than the duration of one symbol in the subframe.

At block 1310, the apparatus transmits the data information in a data portion of the subframe.

At block 1312, the apparatus receives a second ACK/NACK signal from the set of subordinate entities in an ACK portion of the subframe. For example, with reference to FIG. 8, the apparatus may receive a second ACK/NACK signal in symbol 15 of the subframe 803. In one example, the second ACK/NACK signal includes acknowledgment information corresponding to the data information. In one example, the reference signal portion, the control information portion, the data portion, and the ACK portion are contained in the same subframe.

Figure 14:
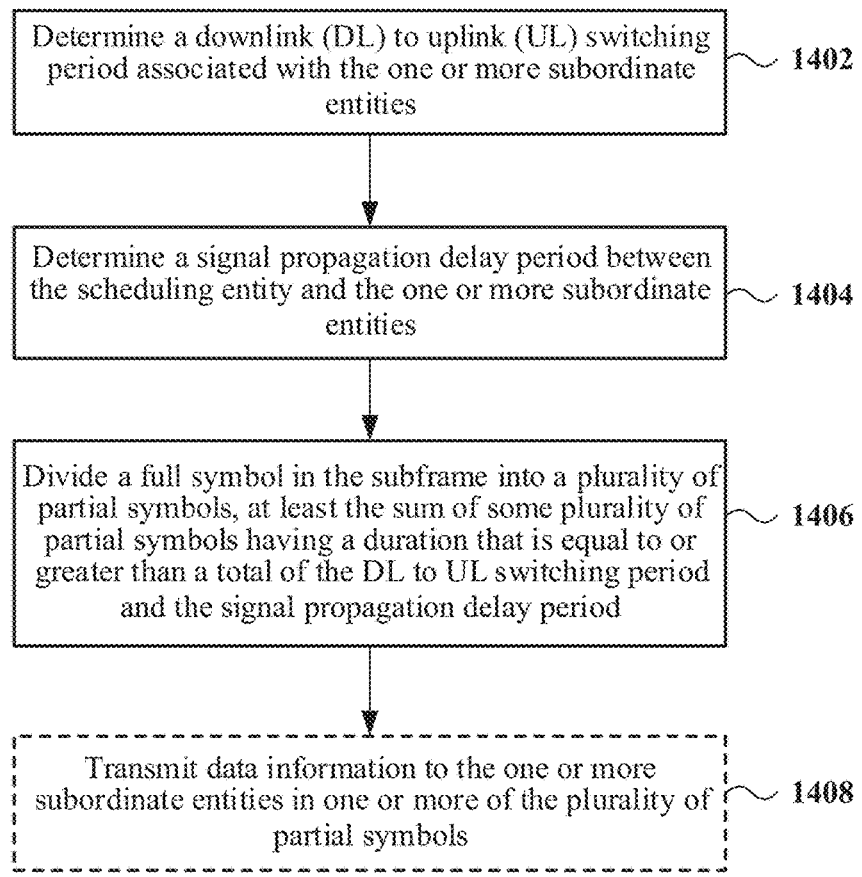
FIG. 14 is a diagram illustrating an example of various methods and/or processes according to aspects of the present disclosure.

FIG. 14 is a diagram 1400 illustrating an example of various methods and/or processes according to some aspects of the present disclosure. The methods and/or processes may be performed by an apparatus. In some configurations, such an apparatus is the apparatus 1102 described above with reference to FIG. 11. In some configurations, such an apparatus is scheduling entity 202 (described above). It should be understood that blocks represented with dotted lines represent optional blocks.

At block 1402, the apparatus determines a DL to UL switching period associated with the one or more subordinate entities. For example, the DL to UL switching period may be an RF switching time, which represents the duration required for the apparatus to change its RF antenna direction.

At block 1404, the apparatus determines a signal propagation delay period between the scheduling entity and the one or more subordinate entities (for example, from a base station or eNode B to a UE). For example, the signal propagation delay period may be the RTT of a signal between a transmitter and receiver, which may be determined by doubling the timing advance (TA) value.

At block 1406, the apparatus divides a full symbol in the subframe into a plurality of scaled symbols, at least one of the plurality of scaled symbols having a duration that is equal to or greater than a total of the DL to UL switching period and the signal propagation delay period. For example, with reference to FIG. 9, the apparatus may divide the full OFDM symbol 904 having a duration of 28 µs by a factor of two to generate two scaled symbols 908 and 910 having a duration of 14 µs for a case where the total of the DL to UL switching period and the signal propagation delay period is less than or equal to 14 µs, hence GP only has to be 14 µs instead another full symbol. As another example, with reference to FIG. 10, the apparatus may divide the full OFDM symbol 1004 having a duration of 28 µs by a factor of three to generate three scaled symbols 1008, 1010, and 1012 having a duration of approximately 9.3 µs for a case where the total of the DL to UL switching period and the signal propagation delay period is less than or equal to 9.3 µs, which leads to a GP of 9.3 µs instead of >31.25 µs. In one example, each of the plurality of scaled symbols are allocated less tones than the full OFDM symbol. In one example, each of the plurality of scaled symbols have a same duration.

At block 1408, the apparatus transmits data information to the one or more subordinate entities in one or more of the plurality of scaled symbols. In one example, the at least one of the plurality of scaled symbols serves as a guard period.

Figure 15:
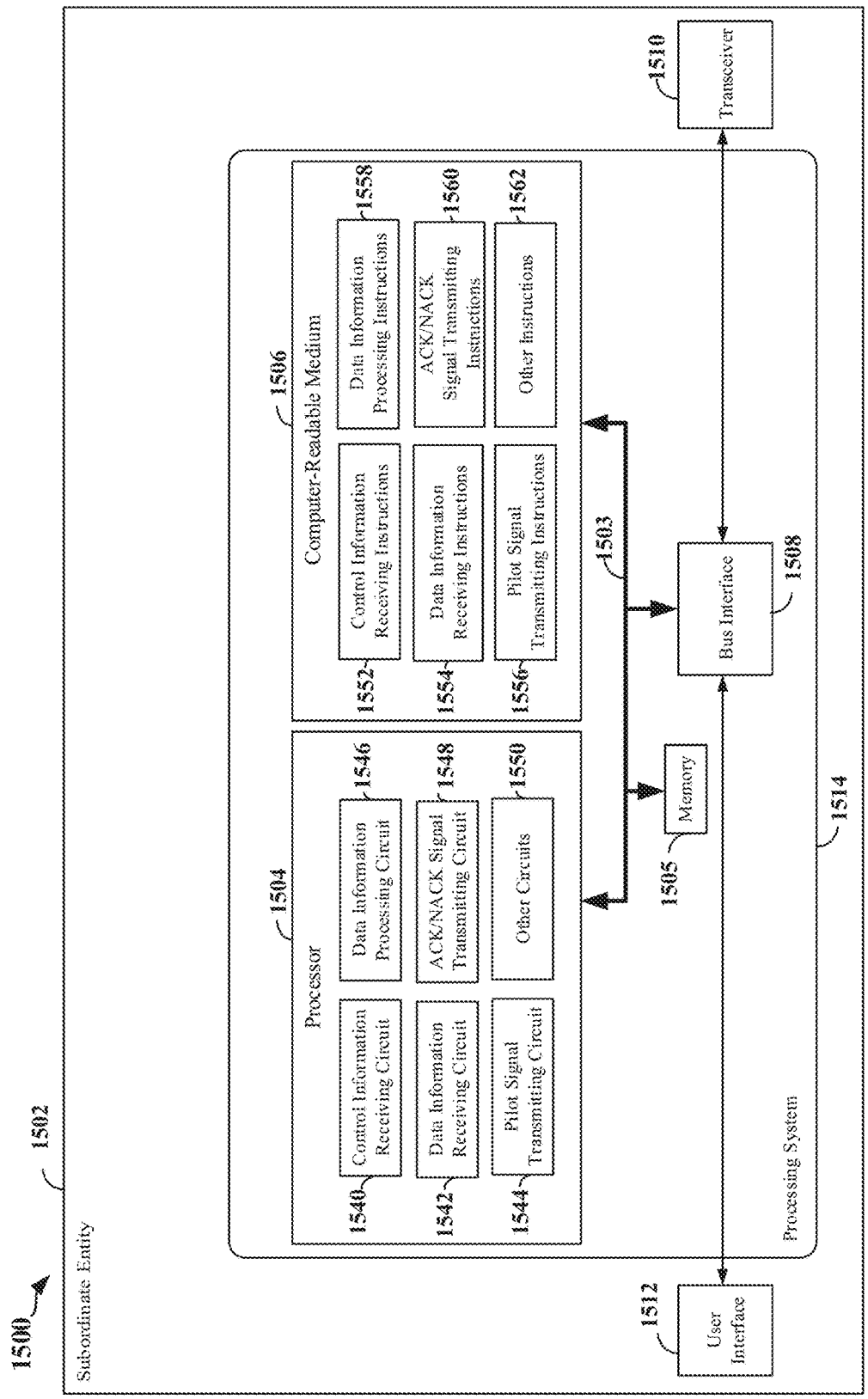
FIG. 15 is a diagram illustrating an example of a hardware implementation of an apparatus according to various aspects of the present disclosure.

FIG. 15 is a diagram illustrating an example of a hardware implementation of an apparatus 1502 according to some aspects of the present disclosure. Generally, the apparatus 1502 may be any device configured for wireless communication. In some configurations, the apparatus 1502 may be the subordinate entity 204, as described in greater detail above. The apparatus 1502 may include a user interface 1512. The user interface 1512 may be configured to receive one or more inputs from a user of the apparatus 1502. The user interface 1512 may also be configured to display information to the user of the apparatus 1502. The user interface 1512 may exchange data via the bus interface 1508.

The apparatus 1502 may also include a transceiver 1510. The transceiver 1510 may be configured to receive data and/or transmit data in communication with another apparatus. The transceiver 1510 provides a means for communicating with another apparatus via a wired or wireless transmission medium. In some configurations, the transceiver 1110 may provide the means for communicating with various other apparatus over a transmission medium. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 1510 may provide the apparatus 1502 with the means for transmitting data (e.g., pilot signal, ACK/NACK signal) to the scheduling entity 202 as well as the means for receiving data (e.g., control information, data information) from scheduling entity 202 (e.g., in a subframe). The transceiver 1510 may be configured to perform such communications using various types of technologies, as described in greater detail above. One of ordinary skill in the art will understand that many types of technologies may perform such communication without deviating from the scope of the present disclosure.

The apparatus 1502 may also include a memory 1505, one or more processors 1504, a computer-readable medium 1506, and a bus interface 1508. The bus interface 1508 may provide an interface between a bus 1503 and the transceiver 1510. The memory 1505, the one or more processors 1504, the computer-readable medium 1506, and the bus interface 1508 may be connected together via the bus 1503. The processor 1504 may be communicatively coupled to the transceiver 1510 and/or the memory 1505.

The processor 1504 may include a control information receiving circuit 1540.

The control information receiving circuit 1540 may include various hardware components and/or may perform various algorithms that provide the means for receiving control information in a control portion of the subframe, the control information corresponding to data information within the subframe.

The processor 1104 may also include a data information receiving circuit 1542. The data information receiving circuit 1542 may include various hardware components and/or may perform various algorithms that provide the means for receiving the data information in a data portion of the subframe.

The processor 1104 may also include a pilot signal transmitting circuit 1544. The pilot signal transmitting circuit 1544 may include various hardware components and/or may perform various algorithms that provide the means for transmitting a pilot signal to the scheduling entity 202 in a pilot portion of the subframe. The processor 1104 may also include a data information processing circuit 1546. The data information processing circuit 1546 may include various hardware components and/or may perform various algorithms that provide the means for processing the data information received in a final symbol of the data portion of the subframe within the total duration of the guard period portion of the subframe and the pilot portion of the subframe.

The processor 1104 may also include an ACK/NACK signal transmitting circuit 1548. The ACK/NACK signal transmitting circuit 1548 may include various hardware components and/or may perform various algorithms that provide the means for transmitting an ACK/NACK signal to the scheduling entity 202 in an ACK portion of the subframe, the ACK portion being subsequent to the pilot portion of the subframe. The ACK/NACK signal includes acknowledgment information corresponding to the data information.

The foregoing description provides a non-limiting example of the processor 1104 of the apparatus 1102. Although various circuits 1540, 1542, 1544, 1546, and 1548 are described above, one of ordinary skill in the art will understand that the processor 1104 may also include various other circuits 1550 that are in addition and/or alternative(s) to the aforementioned circuits 1540, 1542, 1544, 1546, and 1548. Such other circuits 1550 may provide the means for performing any one or more of the functions, methods, processes, features and/or aspects described herein.

The computer-readable medium 1506 may include various computer-executable instructions. The computer-executable instructions may include computer-executable code configured to perform various functions and/or enable various aspects described herein. The computer-executable instructions may be executed by various hardware components (e.g., the processor 1504 and/or any of its circuits 1540, 1542, 1544, 1546, 1548 and 1550) of the apparatus 1502. The computer-executable instructions may be a part of various software programs and/or software modules. The computer-readable medium 1506 may include control information receiving instructions 1552. The control information receiving instructions 1552 may include computer-executable instructions configured for receiving control information in a control portion of the subframe, the control information corresponding to data information within the subframe.

The computer-readable medium 1506 may also include data information receiving instructions 1554. The data information receiving instructions 1554 may include computer-executable instructions configured for receiving the data information in a data portion of the subframe.

The computer-readable medium 1506 may also include pilot signal transmitting instructions 1556. The pilot signal transmitting instructions 1556 may include computer-executable instructions configured for transmitting a pilot signal to the scheduling entity 202 in a pilot portion of the subframe.

The computer-readable medium 1508 may also include data information processing instructions 1558. The data information processing instructions 1558 may include computer-executable instructions configured for processing the data information received in a final symbol of the data portion of the subframe within the total duration of the guard period portion of the subframe and the pilot portion of the subframe.

The computer-readable medium 1508 may also include ACK/NACK signal transmitting instructions 1560. The ACK/NACK signal transmitting instructions 1560 may include computer-executable instructions configured for transmitting an ACK/NACK signal to the scheduling entity in an ACK portion of the subframe, the ACK portion being subsequent to the pilot portion of the subframe. The ACK/NACK signal includes acknowledgment information corresponding to the data information The foregoing description provides a non-limiting example of the computer-readable medium 1106 of the apparatus 1102. Although various computer-executable instructions 1540, 1542, 1544, 1546, and 1548 are described above, one of ordinary skill in the art will understand that the computer-readable medium 1506 may also include various other computer-executable instructions 1562 that are in addition and/or alternative(s) to the aforementioned computer-executable instructions 1540, 1542, 1544, 1546, and 1548. Such other computer-executable instructions 1562 may be configured for any one or more of the functions, methods, processes, features and/or aspects described herein.

The memory 1505 may include various memory modules. The memory modules may be configured to store, and have read therefrom, various values and/or information by the processor 1504, or any of its circuits 1540, 1542, 1544, 1546, 1548, and 1560. The memory modules may also be configured to store, and have read therefrom, various values and/or information upon execution of the computer-executable code included in the computer-readable medium 1506, or any of its instructions 1540, 1542, 1544, 1546, 1548, and 1560. The foregoing description provides a non-limiting example of the memory 1505 of the apparatus 1502. Although various types of data of the memory 1505 are described above, one of ordinary skill in the art will understand that the memory 1505 may also include various other data that are in addition and/or alternative(s) to the aforementioned data. Such other data may be associated with any one or more of the functions, methods, processes, features and/or aspects described herein.

By way of example, an element, or any portion of an element, or any combination of elements may be implemented with a "processing system" (e.g., processing system 1114, 1514) that includes one or more processors (e.g., processors 1104, 1504). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include random access memory (RAM), a read only memory (ROM), a programmable ROM (PROM), an erasable PROM (EPROM), an electrically erasable PROM (EEPROM), optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 16:
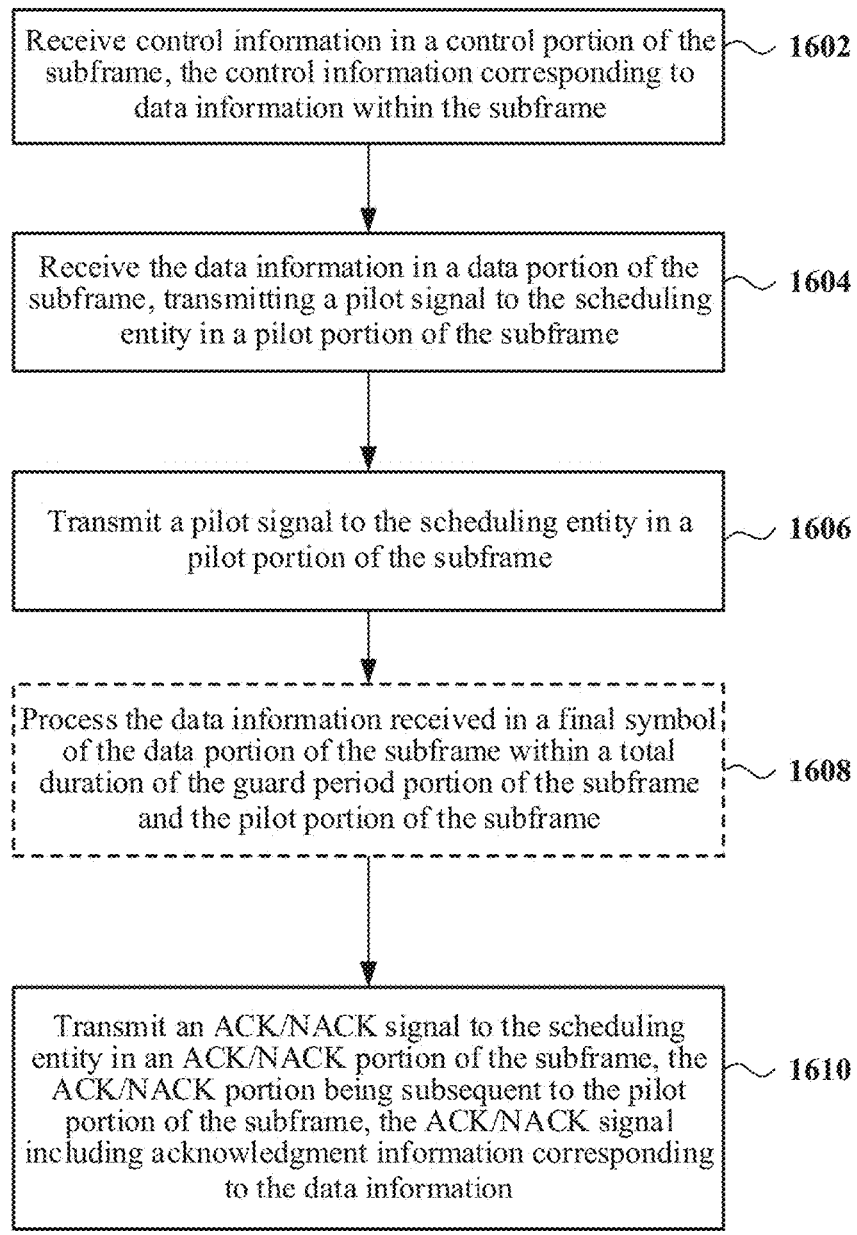
FIG. 16 is a diagram illustrating an example of various methods and/or processes according to aspects of the present disclosure.

FIG. 16 is a diagram 1600 illustrating an example of various methods and/or processes according to some aspects of the present disclosure. The methods and/or processes may be performed by an apparatus. In some configurations, such an apparatus is the apparatus 1502 described above with reference to FIG. 15. In some configurations, such an apparatus is subordinate entity 204 (described above). It should be understood that blocks indicated with dotted lines represent optional blocks.

At block 1602, the apparatus receives control information in a control portion of the subframe, the control information corresponding to data information within the subframe. For example, with reference to FIG. 6, the control portion may be the control information portion 602. Here, when control information corresponds to data information, broadly, this refers to the control information providing scheduling information for scheduling resources corresponding to the data information; modulation and coding information, or other information relating to the data information to enable a receiving device to receive and decode the data information; status information relating to the data information, such as whether the data information is a retransmission; or other similar control information as would be recognized by those of ordinary skill in the art.

At block 1604, the apparatus receives the data information in a data portion of the subframe. For example, with reference to FIG. 6, the data portion may be the DL data portion 604.

At block 1606, the apparatus transmits a pilot signal from the set of subordinate entities in a pilot portion of the subframe. For example, with reference to FIG. 6, the pilot portion may be the first scaled symbol 625 having the third duration 638.

At block 1608, the apparatus processes the data information received in a final symbol of the data portion of the subframe within a total duration of the guard period portion of the subframe and the pilot portion of the subframe.

At block 1610, the apparatus transmits an ACK/NACK signal from the set of subordinate entities in an ACK portion of the subframe, the ACK portion being subsequent to the pilot portion of the subframe, the ACK/NACK signal including acknowledgment information corresponding to the data information. For example, with reference to FIG. 6, the ACK portion may be the second scaled symbol 629 having the fourth duration 640. Here, when the ACK/NACK signal includes acknowledgment information corresponding to the data information, broadly, this refers to the ACK/NACK being configured to acknowledge, or not, the decoding and verification of corresponding packets or transport blocks included in the data information.

The various aspects disclosed herein provide scaled symbols having a duration that is less than a full OFDM symbol. As previously discussed, such scaled symbols may provide fine symbol granularity for reducing a TDD processing timeline. For example, multiple scaled symbols may be configured from the time duration of one full OFDM symbol, and one or more of these scaled symbols may be allocated for pilot prescheduling in order to provide additional processing time and, therefore, improve the processing timeline. The use of the scaled symbols require approximately the same transmission power as a full OFDM symbol, thereby maintaining the same link-budget as a full OFDM symbol. Transmission and reception processing may be facilitated due to the same sampling rate with the scaled symbols and the scaled down FFT size. Efficient interference management may be achieved by implementing synchronous scaled symbols across all subordinate entities for interference management (no ICI for synchronous thin-symbol). In one example, different symbol scaling multiplexing may be used with different subordinate entities (e.g., data vs. control). Controlled interference management may be achieved through guardband and WOLA.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication operable at a subordinate entity for communicating with a scheduling entity over a carrier comprising a plurality of subframes, the method comprising:
   receiving control information in a control portion of a subframe, the control information corresponding to data information within the subframe;
   receiving the data information in a data portion of the subframe;
   determining an acknowledged (ACK)/not acknowledged (NACK) information based on error checking the data information;
   transmitting a pilot signal in a pilot portion of the subframe; and
   transmitting the ACK/NACK information in an ACK portion of the subframe, the ACK portion being subsequent to the pilot portion of the subframe, wherein the control portion, the data portion, the pilot portion, and the ACK portion are contained in the same subframe.

2. The method of claim 1, wherein a duration of the pilot portion of the subframe, and a duration of the ACK portion of the subframe, are each less than a duration of a full symbol in the subframe, and wherein a duration of the pilot portion of the subframe differs from a duration of the ACK portion of the subframe.

3. The method of claim 2, wherein at least a portion of the data information in the data portion utilizes symbols having a duration of a full symbol in the subframe.

4. The method of claim 1, wherein the pilot portion comprises a first cyclic prefix (CP) and the ACK portion comprises a second CP.

5. The method of claim 1, wherein the subframe comprises a guard period portion after the data portion and before the pilot portion, and wherein at least one of:
   a total duration of the guard period portion and the pilot portion is greater than or equal to an approximate duration of a full symbol in the subframe;
   a duration of the guard period portion is based on an over-the-air (OTA) delay between the subordinate entity and the scheduling entity; or
   a duration of the guard period portion is less than a full symbol duration in the subframe.

6. A method of wireless communication operable at a subordinate entity for communicating with a scheduling entity over a carrier comprising a plurality of subframes, the method comprising:
   transmitting first acknowledged (ACK)/not acknowledged (NACK) information in an ACK portion of a first subframe;
   receiving a reference signal in a reference signal portion of a second subframe, wherein a duration of the reference signal portion is less than a duration of a full symbol in the second subframe; and
   receiving control information in a control information portion of the second subframe that is subsequent to the reference signal portion of the second subframe, wherein a duration of the control information portion is less than the duration of a full symbol in the second subframe.

7. The method of claim 6, wherein a duration of the reference signal portion of the second subframe differs from a duration of the control information portion of the second subframe.

8. The method of claim 6, wherein the reference signal portion of the second subframe comprises a first cyclic prefix (CP) and the control information portion of the second subframe comprises a second CP.

9. The method of claim 6, wherein the control information corresponds to data information within the second subframe, the method further comprising:
receiving the data information in a data portion of the second subframe; and
transmitting second ACK/NACK information in an ACK portion of the second subframe,
wherein the reference signal portion, the control information portion, the data portion, and the ACK portion are contained in the same second subframe.

10. The method of claim 9, wherein at least a portion of the data information in the data portion utilizes symbols having a duration of the full symbol in the second subframe.

11. A computer readable medium storing computer executable code, for communicating between a subordinate entity and a scheduling entity over a carrier comprising a plurality of subframes, the computer readable medium comprising instructions for causing the subordinate entity to:
receive control information in a control portion of a subframe, the control information corresponding to data information within the subframe;
receive the data information in a data portion of the subframe;
determine an acknowledged (ACK)/not acknowledged (NACK) information based on error checking the data information;
transmit a pilot signal in a pilot portion of the subframe; and
transmit the ACK/NACK information in an ACK portion of the subframe, the ACK portion being subsequent to the pilot portion of the subframe,
wherein the control portion, the data portion, the pilot portion, and the ACK portion are contained in the same subframe.

12. The computer readable medium of claim 11, wherein a duration of the pilot portion of the subframe, and a duration of the ACK portion of the subframe, are each less than a duration of a full symbol in the subframe, and wherein a duration of the pilot portion of the subframe differs from a duration of the ACK portion of the subframe.

13. The computer readable medium of claim 12, wherein at least a portion of the data information in the data portion utilizes symbols having a duration of a full symbol in the subframe.

14. The computer readable medium of claim 11, wherein the pilot portion comprises a first cyclic prefix (CP) and the ACK portion comprises a second CP.

15. The computer readable medium of claim 11, wherein the subframe comprises a guard period portion after the data portion and before the pilot portion, and wherein at least one of:
a total duration of the guard period portion and the pilot portion is greater than or equal to an approximate duration of a full symbol in the subframe;
a duration of the guard period portion is based on an over-the-air (OTA) delay between the subordinate entity and the scheduling entity; or
a duration of the guard period portion is less than a full symbol duration in the subframe.

16. A computer readable medium storing computer executable code, for communicating between a subordinate entity and a scheduling entity over a carrier comprising a plurality of subframes, the computer readable medium comprising instructions for causing the subordinate entity to:
transmit first acknowledged (ACK)/not acknowledged (NACK) information in an ACK portion of a first subframe;
receive a reference signal in a reference signal portion of a second subframe, wherein a duration of the reference signal portion is less than a duration of a full symbol in the second subframe; and
receive control information in a control information portion of the second subframe that is subsequent to the reference signal portion of the second subframe, wherein a duration of the control information portion is less than the duration of a full symbol in the second subframe.

17. The computer readable medium of claim 16, wherein a duration of the reference signal portion of the second subframe differs from a duration of the control information portion of the second subframe.

18. The computer readable medium of claim 16, wherein the reference signal portion of the second subframe comprises a first cyclic prefix (CP) and the control information portion of the second subframe comprises a second CP.

19. The computer readable medium of claim 16, wherein the control information corresponds to data information within the second subframe, the computer executable code further comprising instructions for causing the subordinate entity to:
receive the data information in a data portion of the second subframe; and
transmit second ACK/NACK information in an ACK portion of the second subframe,
wherein the reference signal portion, the control information portion, the data portion, and the ACK portion are contained in the same second subframe.

20. The computer readable medium of claim 19, wherein at least a portion of the data information in the data portion utilizes symbols having a duration of the full symbol in the second subframe.

21. A subordinate entity configured for wireless communication with a scheduling entity over a carrier comprising a plurality of subframes, the subordinate entity comprising:
a processor;
a memory communicatively coupled to the processor; and
a transceiver communicatively coupled to the processor,
wherein the processor is configured for:
receiving control information in a control portion of a subframe, the control information corresponding to data information within the subframe;
receiving the data information in a data portion of the subframe;
determining an acknowledged (ACK)/not acknowledged (NACK) information based on error checking the data information;
transmitting a pilot signal in a pilot portion of the subframe; and
transmitting the ACK/NACK information in an ACK portion of the subframe, the ACK portion being subsequent to the pilot portion of the subframe, wherein the control portion, the data portion, the pilot portion, and the ACK portion are contained in the same subframe.

22. The subordinate entity of claim 21, wherein a duration of the pilot portion of the subframe, and a duration of the ACK portion of the subframe, are each less than a duration of a full symbol in the subframe, and wherein a duration of the pilot portion of the subframe differs from a duration of the ACK portion of the subframe.

23. The subordinate entity of claim 22, wherein at least a portion of the data information in the data portion utilizes symbols having a duration of a full symbol in the subframe.

24. The subordinate entity of claim 21, wherein the pilot portion comprises a first cyclic prefix (CP) and the ACK portion comprises a second CP.

25. The subordinate entity of claim 21, wherein the subframe comprises a guard period portion after the data portion and before the pilot portion, and wherein at least one of:
- a total duration of the guard period portion and the pilot portion is greater than or equal to an approximate duration of a full symbol in the subframe;
- a duration of the guard period portion is based on an over-the-air (OTA) delay between the subordinate entity and the scheduling entity; or
- a duration of the guard period portion is less than a full symbol duration in the subframe.

26. A subordinate entity configured for wireless communication with a scheduling entity over a carrier comprising a plurality of subframes, the subordinate entity comprising:
- a processor;
- a memory communicatively coupled to the processor; and
- a transceiver communicatively coupled to the processor, wherein the processor is configured for:
  - transmitting first acknowledged (ACK)/not acknowledged (NACK) information in an ACK portion of a first subframe;
  - receiving a reference signal in a reference signal portion of a second subframe, wherein a duration of the reference signal portion is less than a duration of a full symbol in the second subframe; and
  - receiving control information in a control information portion of the second subframe that is subsequent to the reference signal portion of the second subframe, wherein a duration of the control information portion is less than the duration of a full symbol in the second subframe.

27. The subordinate entity of claim 26, wherein a duration of the reference signal portion of the second subframe differs from a duration of the control information portion of the second subframe.

28. The subordinate entity of claim 26, wherein the reference signal portion of the second subframe comprises a first cyclic prefix (CP) and the control information portion of the second subframe comprises a second CP.

29. The subordinate entity of claim 26, wherein the control information corresponds to data information within the second subframe, and wherein the processor is further configured for:
- receiving the data information in a data portion of the second subframe; and
- transmitting second ACK/NACK information in an ACK portion of the second subframe,
- wherein the reference signal portion, the control information portion, the data portion, and the ACK portion are contained in the same second subframe.

30. The subordinate entity of claim 29, wherein at least a portion of the data information in the data portion utilizes symbols having a duration of the full symbol in the second subframe.

* * * * *